United States Patent
Ito et al.

(10) Patent No.: US 7,574,040 B2
(45) Date of Patent: Aug. 11, 2009

(54) CORRECTION OF THE COLORIMETRIC VALUE OF COLORS MEASURED UNDER DIFFERENT OBSERVATION CONDITIONS AND GENERATION OF THEIR PROFILES

(75) Inventors: Takashi Ito, Nagano-ken (JP); Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 743 days.

(21) Appl. No.: 11/335,303

(22) Filed: Jan. 18, 2006

(65) Prior Publication Data

US 2006/0187455 A1 Aug. 24, 2006

(30) Foreign Application Priority Data

Jan. 19, 2005 (JP) ............................. 2005-011102
Jan. 26, 2005 (JP) ............................. 2005-018160

(51) Int. Cl.
G06K 9/00 (2006.01)
(52) U.S. Cl. ...................... 382/167; 382/162
(58) Field of Classification Search ................ 382/162, 382/167; 358/474, 500, 518, 520, 528, 524; 356/402, 405; 345/593, 604; 348/234; 427/219, 427/220; 428/407
See application file for complete search history.

(56) References Cited

U.S. PATENT DOCUMENTS

| | | | | |
|---|---|---|---|---|
| 5,543,940 A | * | 8/1996 | Sherman | 358/518 |
| 5,546,195 A | * | 8/1996 | Arai | 358/518 |
| 5,579,031 A | * | 11/1996 | Liang | 345/604 |
| 5,592,294 A | * | 1/1997 | Ota et al. | 356/402 |
| 6,671,050 B2 | * | 12/2003 | Sugiyama et al. | 356/405 |
| 7,433,102 B2 | | 10/2008 | Takahashi et al. | |
| 7,480,083 B2 | * | 1/2009 | Takahashi et al. | 358/474 |

FOREIGN PATENT DOCUMENTS

| | | |
|---|---|---|
| JP | 09-214786 | 8/1997 |
| JP | 10-142775 | 5/1998 |
| JP | 2001-084288 | 3/2001 |
| JP | 2003-326768 | 11/2003 |

OTHER PUBLICATIONS

Abstract of Japanese Patent Publication No. 09-214786, Pub. Date: Aug. 15, 1997, Patent Abstracts of Japan.
Abstract of Japanese Patent Publication No. 2001-084288, Pub. Date: Mar. 30, 2001, Patent Abstracts of Japan.
Abstract of Japanese Patent Publication No. 2003-326768, Pub. Date: Nov. 19, 2003, Patent Abstracts of Japan.
Abstract of Japanese Patent Publication No. 10-142775, Pub. Date: May 29, 1998, Patent Abstracts of Japan.

* cited by examiner

*Primary Examiner*—Anh Hong Do
(74) *Attorney, Agent, or Firm*—Martine Penilla & Gencarella, LLP

(57) ABSTRACT

For extracting a spectral distribution for correcting a result of color measurement under a first observation condition into a result of color measurement under a second observation condition, a first calorimetric value resulting from the color measurement of a sample specimen for evaluation under the first observation condition is acquired, a second calorimetric value resulting from the color measurement of the sample specimen for evaluation under the second observation condition is acquired, and the variable component of the spectral distribution depending on an observation condition as the component of the spectral distribution relating to the sample specimen for evaluation based on the first calorimetric value and the second calorimetric value.

14 Claims, 8 Drawing Sheets

FIG. 1

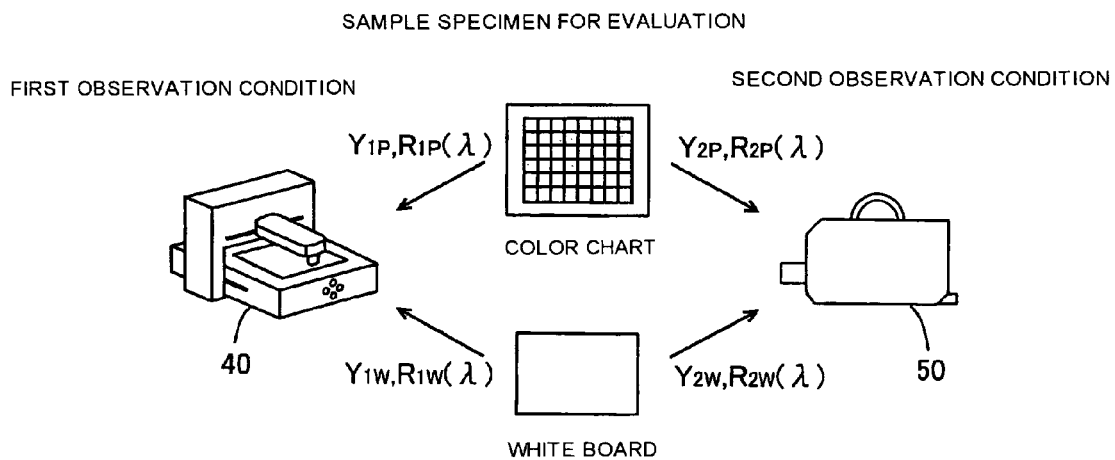

$Y_{2P} = K_m \Sigma R_{2P}(\lambda) \cdot \bar{y}(\lambda) \cdot \Delta \lambda$ $= K_m \Sigma R_{2W}(\lambda) \cdot (R_P(\lambda) + R_M(\lambda)) \cdot \bar{y}(\lambda) \cdot \Delta \lambda$ $= Y_P + Y_M$ $Y_{2P} - Y_P = Y_M = K_m \Sigma R_{2W}(\lambda) \cdot k_W \cdot (\bar{x}(\lambda) + \bar{y}(\lambda) + \bar{z}(\lambda)) \cdot \bar{y}(\lambda) \cdot \Delta \lambda$ $Y' = K_m \Sigma R_{2W}(\lambda) \cdot \left( \dfrac{R_1(\lambda)}{R_{1W}(\lambda)} + k_W \cdot (\bar{x}(\lambda) + \bar{y}(\lambda) + \bar{z}(\lambda)) \right) \cdot \bar{y}(\lambda) \cdot \Delta \lambda$

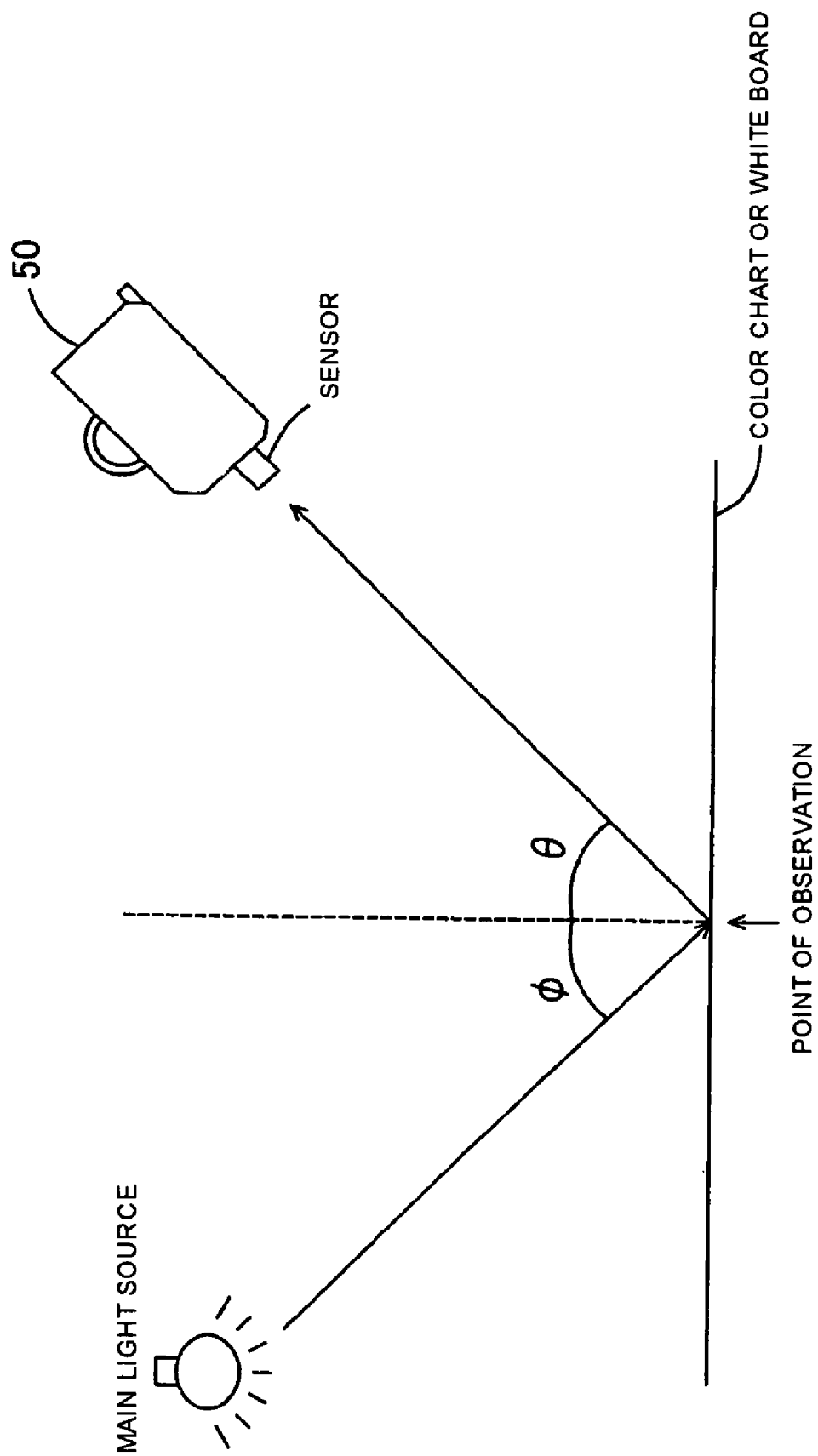

CORRECTION OF THE COLORIMETRIC VALUE OF COLORS MEASURED UNDER DIFFERENT OBSERVATION CONDITIONS AND GENERATION OF THEIR PROFILES

The entire disclosure of Japanese Patent Application No. 2005-11102, filed Jan. 19, 2005, is expressly incorporated by reference herein.

The entire disclosure of Japanese Patent Application No. 2005-18160, filed Jan. 26, 2005, is expressly incorporated by reference herein.

BACKGROUND OF THE INVENTION

1. Field of the Invention

The present invention relates to an art of measuring colors by means of a calorimeter and an art of printing based on profiles obtained thereby.

2. Description of the Related Art

The colorimeter is used to measure correctly the color of outputs by an output device, for example, the color of prints and outputs of a display. JP-A-10-142775 is an example of related art.

So far, the colorimetric values resulting from the measurement of colors by means of a colorimeter have been used on the assumption that such calorimetric values are correct. For example, a color conversion table is used to output desired colors on a printing device, and for the preparation of this color conversion table, the colorimeter is used. In other words, with regard to the color gradation value in instrument-dependent color spaces, for example, the color gradation value for which the amount of recording materials used is specified for each color in a printing device, actual output must be made based on this color gradation value to specify colors.

Therefore, actually the required number of patches are printed, and their colors are measured by means of a calorimeter to obtain a calorimetric value, and this calorimetric value is used to correlate the color gradation value in the instrument-independent color spaces and the color gradation value for each color of the recording material mentioned above constituting thus a color conversion table. Here, in the colorimeter, the observation conditions are specified for measuring the colors of the patches, and any calorimetric value is correct as far as these observation conditions are assumed. However, nobody can say that this calorimetric value is correct even under different observation conditions. In other words, the result of conversion based on this color conversion table is strictly correct only when the print is observed under the same observation conditions as that for the calorimeter.

It is only natural that the colorimetric value differs when observation conditions are different. However, when the colorimetric value is largely different between the observation condition under which the object of color measurement is measured by a calorimeter and the observation condition existing in the environment when the object of color measurement is actually is used, there will be problems when the object of color measurement is actually used. In other words, when the observation conditions serving as the basis for making a color conversion table and the observation conditions under which the observer observes the print are different, the observer may feel that the color is different from the color intended by the author when he or she made the color conversion table mentioned above. For example, the observer may feel that color contrast is weaker than that intended by the author, or the observer may feel that the print has a hue different from the color intended by the author. Particularly with regards to outputs whose color appearance tends to be different due to difference in observation conditions, for example, with regards to outputs printed by pigment ink, the above problem tends to occur.

And although it is preferable that a calorimeter be available for measuring colors under the observation conditions for observing actually the object of color measurement, the use of such a calorimeter for measuring the color of a large number of objects of color measurement is often inconvenient. In other words, there are two types of color measurement devices. One is a color measurement device capable of automatically measuring a plurality of objects of color measurement and the other is one capable of measuring the color of a plurality of objects of color measurement by changing the object of color measurement by manual operation. The former operates in the state wherein observation conditions have been determined in advance, while the latter involves the discretion of the operator vis-a-vis the choice of observation conditions.

However, in the case of color measurement for various uses by making the above-mentioned color conversion table, however, it is almost indispensable to measure color automatically. In other words, it is necessary to measure the color of a large number (for example 1,000) patches in order to make a color conversion table. However, it is unrealistic to measure one by one the color of such a large number of patches by manual operation, and their automatic measurement is almost indispensable. Therefore, in the past, it has been difficult to acquire correct calorimetric values when a large number of objects of color measurement are observed under a required observation condition.

SUMMARY

An advantage of some aspects of the present invention is to acquire the result of measuring the color of a large number of objects of color measurement under desired observation conditions.

Another advantage of some aspects of the present invention is to make a profile and to print based on the result of automatic color measurement.

According to a first aspect of the invention, a spectral distribution computing method for extracting a spectral distribution for correcting a result of color measurement under a first observation condition into a result of color measurement under a second observation condition, comprising:

acquiring a first colorimetric value obtained by measuring a color of a sample specimen for evaluation under the first observation condition, acquiring a second colorimetric value obtained by measuring a color of the sample specimen for evaluation under the second observation condition, and computing a variable component of the spectral distribution depending on an observation condition based on the first calorimetric value and the second colorimetric value as the component of the spectral distribution relating to the sample specimen for evaluation.

In the present method, the color of sample specimens for evaluation is measured under the first observation condition and the second observation condition, and the variable component depending on the observation conditions of the spectral distribution mentioned above is computed based on the calorimetric values acquired under both conditions as the component of the spectral distribution for the sample specimens for evaluation mentioned above. The colorimetric values acquired by measuring the color of the same sample specimen under different observation conditions will be different values, and this difference results from the variation of the spectral distribution depending on the observation conditions obtained by measuring the color of sample specimens for evaluation.

This spectral distribution is expressed by the product of multiplying the spectral distribution of the light (light source) irradiated on the sample specimen for evaluation by the spectral distribution (spectral reflectance) of the sample specimen for evaluation itself. It is obvious that any changes in observation conditions leads to changes in the components corresponding to the spectral distribution of the light source. However, in the present invention, it is assumed further that the spectral distribution of the sample specimen for evaluation contains a component of the spectral distribution that does not change depending on observation conditions and a component of the spectral distribution that changes depending on the observation conditions.

In other words, the applicant of the present application invented that, although any change in the observation condition obviously causes changes in the spectral distribution of a light source, any change in the calorimetric values resulting from a difference in observation conditions can be correctly corrected considering that the spectral distribution relating to the sample specimen for evaluation is not constant but contains a variable component of the spectral distribution depending on observation conditions. This variable component of the spectral distribution dependent on observation conditions can be computed based on the colorimetric value of the sample specimen for evaluation under the first observation condition and the second observation condition.

In other words, as the result of color measurement under the first observation condition is corrected to become the result of color measurement under the second observation, it is possible to estimate the invariable component of the spectral distribution dependent on observation condition based on the calorimetric value under the first observation condition. And, if it is possible to estimate the invariable component of the spectral distribution dependent on observation condition, it is possible to compute the variable component of the spectral distribution dependent on observation conditions based on the component excluding the invariable component of the spectral distribution dependent on observation conditions from the calorimetric value obtained under the second observation condition.

According to a second aspect of the invention, a spectral distribution computing method for extracting a spectral distribution for correcting a result of color measurement under a first observation condition into a result of color measurement under a second observation condition, wherein the spectral distribution measured under the second observation condition is assumed to include the spectral distribution observed under the first observation condition and the spectral distribution in the prescribed functional form added to the spectral distribution observed under the first observation condition, and the spectral distribution in the prescribed functional form is computed based on the calorimetric value acquired under the first observation condition and the second observation condition.

According to this method, what is required is that a spectral distribution for acquiring the result of color measurement under the second observation condition by correcting the result of color measurement under the first observation condition can be obtained. Therefore, it is possible to assume that the spectral distribution measured under the second observation condition includes the spectral distribution observed under the first observation condition, the spectral distribution in the prescribed functional form added to this spectral distribution and to adopt a system for computing this spectral distribution. Of course, when the spectral distribution measured under the second observation condition is reviewed by dividing the same into the component of the spectral distribution attributable to the light source and the component of the spectral distribution attributable to the object of color measurement, it would be correct to consider that the component of the spectral distribution attributable to the object of color measurement consists of the spectral distribution observed under the first observation condition and the spectral distribution in the specified functional form added to this spectral distribution.

By computing the spectral distribution in the specified function form and the variable component of the spectral distribution depending on observation conditions, it will be possible to correct the result of color measurement under the first observation condition into the result of color measurement under the second observation condition based on this spectral distribution. In other words, when the product of multiplying the component of the spectral distribution attributable to the object of observation formed by the sum of the component of the spectral distribution mentioned above and the computed component of the spectral distribution measured under the first observation condition by the component corresponding to the spectral distribution of the light source under the second observation condition is computed, it will be possible to compute the tristimulus values and other calorimetric values based on the publicly known formulae.

According to a third aspect of the invention, A color measuring method for correcting a result of color measurement under a first observation condition into a result of color measurement under a second observation condition, comprising:

measuring a color of an object of color measurement under the first observation condition, and recording in a specified recording medium, in advance, data for converting a calorimetric value acquired by color measurement into a colorimetric value acquired by measuring the color of the object of color measurement under the second observation condition, and converting the calorimetric value acquired by color measurement into the calorimetric value acquired by measuring the color of the object of color measurement under the second observation condition with reference to the recorded data.

According to this method, the data for converting the colorimetric value acquired by measuring the color of the object of color measurement under the first observation condition into a colorimetric value acquired by measuring color under the second observation condition are generated in advance. This data may be data showing the spectral distribution computed as described above, or data correlating a plurality of colorimetric values obtained under the first observation condition and a plurality of colorimetric values obtained under the second observation condition. The latter data may be prepared by computing corrected data corresponding to data before correction in advance based on the computed spectral distribution mentioned above.

Obviously, the color measuring apparatus may be a calorimeter having a light receiving unit, or an apparatus for acquiring colorimetric values by transmitting the detection result by the light receiving unit to the computer.

According to a fourth aspect of the invention, a profile generating method for generating a profile for correlating image data and a colorimetric value of an output based on the image data, comprising:

acquiring a calorimetric value of an output result based on the image data by measuring the color of the same under a first observation condition, converting the calorimetric value acquired into a calorimetric value resulting from the color measurement of the output result under a second observation condition, and generating the profile by correlating the converted calorimetric value and the image data.

According to this method, the colorimetric value resulting from the measurement of color under the second observation condition from the colorimetric value resulting from the measurement of color of the output result based on the image data under the first observation condition is acquired, and profiles are made by correlating the calorimetric value acquired and the image data. In other words, profiles are made by acquiring the calorimetric value resulting from the measurement of color under the second observation condition different from the first observation condition under which color is actually measured.

Therefore, it will be possible to carry out a large number of color measurements under the first observation condition suitable for such a large number of color measurements and to generate profiles based on the calorimetric values obtained as a result thereof. And even if a large number of objects of measurement are involved, their color can be easily measured and their profiles can be made thereby. And the adoption of the observation condition for actually observing the output result as the second observation condition will enable to generate the profile in such a way that the color intended by the profile author may be outputted. Obviously, here all that is required for the profiles is that they correlate the image data and the colorimetric value of the output based on the image data, and they may take the form of a color conversion table containing a plurality of data correlating color gradation values in different color systems or they may be a function correlating color gradation values in different color systems. Thus, various structures may be adopted.

As described above, the spectral distribution data may be computed by various methods, and the calorimetric values may be converted based on the results obtained. Or instead of the spectral distribution data, the correlation among the calorimetric values computed in advance may be used for converting the calorimetric values. In any case, profiles can be generated by this conversion, and further color conversion profiles can be generated based on such profiles.

Therefore, according to a fifth aspect of the invention, a printing controlling method for executing printing by converting a color with reference to a color conversion profile wherein, a color conversion profile represents data generated by acquiring the calorimetric value obtained by measuring under a first observation condition a color of an output result based on an image data handled by a first image equipment, converting this calorimetric value into a calorimetric value acquired by measuring the color of the output result under a second observation condition, correlating the converted calorimetric value with the image data, and defining a correlation between the image data and a second image data based on this correlation and the correlation between the second image data handled by the second image equipment and the colorimetric value of its output.

Here, the color conversion profile refers to the profile that determines the correlation between the image data handled by the first image equipment and the second image data handled by the second image equipment, and this color conversion profile is used for general purpose by various image equipment. Accordingly, once the correlation between the second image data handled by the second image equipment and the calorimetric value of its output is acquired in advance, it will be possible to generate color conversion profiles by referring to the profiles acquired (correlation between the image data handled by the first image equipment and the colorimetric values). Therefore, the preparation of this color conversion profile is also a part of the invention.

Incidentally, if it is possible to compute variable components of the spectral distribution depending on the observation condition relating to the sample specimen for evaluation mentioned above, it will be possible to correct the result of color measurement under the first observation condition based on this spectral distribution into the result of color measurement under the second observation condition. In other words, it will be possible to correct the result of color measurement by acquiring the invariable components of the spectral distribution depending on the observation condition from the result of color measurement under the first observation condition, and by combining them with the variable component of the spectral distribution depending on the observation condition mentioned above.

Incidentally, since the first observation condition is, as described above, the observation condition for estimating the invariable component of the spectral distribution depending on the observation condition based on the calorimetric value, an observation condition in a calorimeter for measuring color by using a light source specified in advance is preferable. In other words, as the observation conditions, the type of light source, the irradiating direction of light from the light source, the orientation direction of the sensor to the object of color measurement in the colorimeter, the physical property of the object of color measurement (the type of printing medium in the print or coloring material used in printing) and other conditions are possible.

As the designation of sample specimens for evaluation here results in the designation of the physical property of the object of color measurement, the use of a colorimeter for measuring color by using a light source designated in advance (a calorimeter with built-in light source) will enable to designate the type of light source, the emanating direction of light from the light source, and the orientation direction of the sensor to the object of color measurement in a colorimeter among the main elements of the observation conditions. If the main elements of the observation conditions are thus specified fixedly, it is possible to assume that there is not variable component of spectral distribution depending on the observation condition in the calorimetric value obtained under the first observation condition.

On the other hand, in the case of a colorimeter for measuring color by using any optional light source (a calorimeter without built-in light source), it is normal to prepare a certain light source for measuring color. However, even if the object of color measurement is irradiated by this light source, the object of color measurement will be irradiated by light from many directions existing in addition to this light source. Therefore, it will be possible to measure color in a state close to the observation condition under which prints and other objects of color measurement will be actually observed. Thus, it has been found that, under the observation condition of irradiating the object of color measurement with light from many directions, the contribution of the variable component of spectral distribution depending on the observation condition picked up in the present invention will grow larger.

Therefore, according to the structure mentioned above, it will be possible to acquire the result of color measurement resulting from the color measurement in a state close to the condition of actually observing the object of color measurement by using the result of color measurement by means of a calorimeter having a light source. And as calorimeter having a light source, there are those that automatically measure the color of a large number of objects of color measurement, while in calorimeter without light source generally the objects of color measurement are manually set, and in the case of measuring the color of a plurality of objects of color measurement, the position of the objects of color measurement is successively changed in the process of color measurement. Therefore, according to the present invention, it will be possible to acquire automatically the result of color measurement of a large number of objects of color measurement, and to acquire the result of color measurement resulting from the measurement of color in a state close to the observation condition of actually observing the objects of color measurement based on the result of color measurement.

As described above, any change in observation condition results in a change in the spectral distribution of a light source. And this method enables to acquire calorimetric values by correction even under an observation condition where the spectral distribution of a light source is difficult to specify (an observation condition in a calorimeter for measuring color by using any optional light source). Therefore, for extracting a variable component or components of the spectral distribution depending on observation conditions in the present invention, it is preferable to exclude the spectral distribution of light irradiated on the objects of color measurement.

As a structure for this purpose, it is preferable to use the result of color measurement on a white board. In other words, a white board is a sample having a nearly constant reflectance across the whole wavelength of visible light, and the measurement of this spectral distribution will enable to acquire a nearly equivalent spectral distribution as the spectral distribution of light irradiated on the objects of color measurement in that observation condition. Specifically, the color of a white board is measured under the first observation condition and the second observation condition, and the spectral distribution acquired is considered as the spectral distribution of light irradiated by the sample specimen for evaluation in each observation condition. Once this spectral distribution is acquired, the component of the spectral distribution of the light source can be easily separated from the other components of spectral distribution among the colorimetric value acquired by measuring the sample specimen for evaluation under the second observation condition. Therefore, it will be very easy to analyze on the assumption that the remaining spectral distribution consists of a variable component of the spectral distribution depending on the observation condition and an invariable component of the spectral distribution depending on the observation condition.

And the variable component of the spectral distribution depending on the observation condition may be a variable component of the spectral distribution depending on the wavelength of visible light, and various functional forms can be assumed. As a preferable function for this spectral distribution component, a function consisting of the product obtained by multiplying a constant by a function depending on a wavelength determined in advance may be adopted. In other words, it will be possible to express the dependence on the observation conditions by the constant part. In concrete terms, once a function depending on a wavelength is determined in advance in this structure, the function depending on the wavelength may be a component not depending on the observation conditions.

In addition, the constant mentioned above shall be defined as a constant under the same observation condition but a variable constant depending on the observation condition. As a result, the dependence on the observation condition can be expressed solely by the constant part, and it will be possible to handle very easily the dependence on the observation condition. As functions depending on a wavelength specified in advance, various functions may be adopted, and for example a linear coupling of color matching functions may be adopted.

In other words, the color matching functions have a property corresponding to the sensitivity of the human eyes and is defined as a function depending on the wavelength of visible light. On the other hand, the impact of variable spectral distribution depending on the observation conditions is recognized when it is observed by the human eyes. Therefore, the definition of functions depending on the wavelength determined in advance by the linear coupling of these color matching functions enables to define the spectral distribution reflecting to some extent recognition by human eyes. As a result, it will be possible to express precisely the dependency on wavelength of variable component of spectral distribution depending on the observation conditions.

As concrete methods for proceeding to a linear coupling, various methods may be adopted. For example, the sum of three color matching functions may be adopted for this method. Of course, a method of expressing the variable component of the spectral distribution depending on the observation condition by the product of multiplying a constant by the function depending on the wavelength previously set is an example, and it is possible to adopt various systems as long as this spectral distribution varies depending on the observation condition.

And it is possible to adopt various observation conditions as the observation condition on which the above-mentioned component of the spectral distribution depends. For example, it is possible to adopt a system that depends on any of or a combination of a printing medium for printing a sample specimen for evaluation, the type of coloring material for printing the sample specimen for evaluation, or the type of light source. In other words, we consider that, since the printing medium for printing the sample specimen for evaluation or the type of coloring material for printing the sample specimen for evaluation affects the spectral distribution of the object of color measurement, any difference in these elements causes a change in the observation condition. Incidentally, the types of color material include ink or toner consisting of a dye or a pigment and all the conditions that can change its spectral distribution such as differences in the composition of these elements.

Since the type of light source affects the spectral distribution of the light received by the calorimeter when the color of the object of color measurement is measured, any change in the type of light source should be considered as causing a change in the observation condition, and this changes the variable component of the spectral distribution depending on the observation condition. Of course, the object of the present invention is to enable to acquire calorimetric values by correction even under an observation condition involving the difficulty of specifying in advance the spectral distribution of the light source (observation condition in a calorimeter for measuring color by using any optional light source). Accordingly, as the type of light source mentioned above, in addition to the method of specifying a type of light source, the main light source may be specified, or without specifying the light source, the light source may be indicated by specifying abstractly the light source such as the sun, fluorescent light and the like or by specifying the surrounding environment such as the color temperature of the light source, or weather such as fine or cloudy sky and the like.

In addition, the observation condition on which the component of spectral distribution mentioned above depends may be defined as one depending on the relative positional relationship between the light source, the sample specimen for evaluation and the light receiving unit of the calorimeter. In other words, it has been found that the variable spectral distribution depending on the observation condition can vary depending on the angle of observing the sample specimen for evaluation, and in order to describe this variation, we will consider that the spectral distribution depends on the relative positional relationship described above. In this structure, it will be possible to acquire a spectral distribution close to the actual observation condition by defining the relative positional relationship mentioned above by an angle close to the one at which the sample specimen will be actually observed.

Incidentally, all that is required of a relative positional relationship is that the positional relationship among the light source, the sample specimen for evaluation and the light receiving unit of the calorimeter can be defined, and it is possible to adopt angles and the like. For example, regarding the angle between the light source and the sample specimen for evaluation, the perpendicular line from an observation point set on a flat surface sample specimen to the sample specimen is defined, and a straight line linking this observation point and the light source is defined, and the angle between this straight line and a perpendicular line is defined. In addition, when a straight line linking this observation point and the light receiving unit of the calorimeter is defined, and the angle between this straight line and the above-mentioned perpendicular line is defined, the positional relationship among the light source, the sample specimen for evaluation and the light receiving unit of the colorimeter can be defined.

As the distance among the light source, the light receiving unit of the colorimeter and the sample specimen for evaluation affects little the spectral distribution, the distance may be set optionally. However, the distance may obviously be taken into consideration. Incidentally, when an observation condition involving the difficulty of specifying in advance the spectral distribution of light source is taken into account as mentioned above, it is enough to define the position of the main light source and to define the positional relationship among this light source, the sample specimen for evaluation and the light receiving unit of the colorimeter when the sample specimen for evaluation is irradiated with a large number of rays.

As the observation condition for the fourth aspect and the fifth aspect mentioned above, it is preferable to choose the observation condition in the colorimeter for measuring color by using a light source previously specified (a calorimeter with a light source) as the first observation condition. In other words, as there are calorimeter that automatically measures the color of a large number of objects for color measurement for this calorimeter, the use of this calorimeter enables to measure automatically the color of objects of color measurement under the first observation condition. On the other hand, it is preferable to adopt the observation condition for a calorimeter for color measurement by using an optional light source as the second observation condition. In other words, in this calorimeter, generally the object for color measurement should be manually set, and for measuring the color of a plurality of objects of color measurement, the position of objects for color measurement should be changed successively for the measurement of color.

Therefore, it is difficult to measure automatically the color of a large number of objects for color measurement by this calorimeter. However, as it is possible to use any optional light source, it is possible to measure the color of output results by creating the observation condition of actually observing the same, for example, condition close to the observation condition existing at the time of actually observing the print. Therefore, it will be possible to generate profiles that reproduce faithfully the color under the observation condition for actually observing the object.

As an example of converting the calorimetric value acquired by measuring color of the output result under the first observation condition into the calorimetric value obtained by measuring the color of the output result under the second observation condition, the data for converting the colorimetric value resulting from the color measurement under the first observation condition into the calorimetric value resulting from the color measurement of the output result mentioned above under the second observation condition are generated in advance, and the converting operation based on these data may be cited.

It is possible to adopt various types of data for these data as long as the conversion described above can be implemented. For example, it is possible to adopt a system wherein the calorimetric value obtained under the first observation condition and the colorimetric value obtained under the second observation condition may be correlated, and this correlation is stipulated by a plurality of data or functions. Of course, when a plurality of data are used for the converting operation, it is possible to adopt a method wherein any optional calorimetric values may be converted by an interpolating computing.

And the method of computing calorimetric values under the second observation condition by prescribed computing may be adopted. For example, as the use of spectral distribution corresponding to the reflectance for each wavelength of visible light enables to compute calorimetric values in the instrument-independent color spaces by using color-matching functions, the above-mentioned conversion may be performed by using the data showing the spectral distribution for acquiring calorimetric values under the second observation condition by combining them with the spectral distribution under the first observation condition.

The profile mentioned above may take form of a table corresponding to a plurality of combinations between the colorimetric value and image data or a function correlating both of them, and various structures can be adopted. In any case, the profile may be produced by acquiring the correlation between the calorimetric values and the image data mentioned above for a plurality of combinations.

The above structure stands as an invention of apparatus based on similar technical philosophy.

According to the sixth aspect of the invention, a spectral distribution computing device for extracting a spectral distribution for correcting a result of color measurement under a first observation condition into a result of color measurement under a second observation condition, comprises:

a first calorimetric value acquiring unit for acquiring a first calorimetric value obtained by measuring a color of a sample specimen for evaluation under the first observation condition, a second calorimetric value acquiring unit for acquiring a second calorimetric value obtained by measuring a color of the sample specimen for evaluation under the second observation condition, and a spectral distribution computing unit for computing a variable component of the spectral distribution depending on an observation condition as the component of the spectral distribution relating to the sample specimen for evaluation based on the first calorimetric value and the second calorimetric value.

According to the seventh aspect of the invention, a calorimetric device for correcting a result of color measurement under a first observation condition into a result of color measurement under a second observation condition comprises;

a color measuring unit for measuring a color of an object for color measurement under the first observation condition, a conversion data recording unit for recording the data for converting the calorimetric values resulting from color measurement into a calorimetric value resulting from the color measurement of the object of color measurement under the second observation condition, and a calorimetric value converting unit for converting the calorimetric value acquired by color measurement by the color measuring unit with reference to the recorded data into the calorimetric value resulting from the color measurement of the object of color measurement mentioned above under the second observation condition.

According to the eighth aspect of the invention, a profile generating device for generating a profile for correlating image data and a calorimetric value of an output based on the image data comprises;

a calorimetric value acquiring unit for acquiring a calorimetric value of an output result based on the image data by measuring the color of the same under a first observation condition, a calorimetric value converting unit for converting the colorimetric value acquired into a colorimetric value resulting from the color measurement of the output result mentioned above under a second observation condition, and a profile generating unit for generating the profile mentioned above by correlating the converted colorimetric value and the image data mentioned above.

Here according to the eighth aspect of the invention, the first observation condition may be an observation condition in a calorimeter for measuring color by using a light source specified in advance, and the second observation condition may be an observation condition in a colorimeter for measuring color by using any optional light source. It is difficult to automatically measure the color of a large number of objects of color measurement with a calorimeter for measuring color by using any optional light source. However, due to the possibility of using any optional light source, it will be possible to measure color by forming an observation condition of actually observing the output result, for example, a condition close to the observation condition of actually observing the print for proceeding to the color measurement of the object. Therefore, it will be possible to produce profiles that reproduce faithfully the color under the observation condition of actually observing the same.

In addition, for the eighth aspect of the invention, the calorimetric value converting unit may proceed to the color conversion mentioned above based on the spectral distribution data computed by taking the variable component of the spectral distribution depending on the observation condition as the component of the spectral distribution relating to the object of color measurement. When the spectral distribution data showing the variable component of the spectral distribution depending on the observation condition are used, it will be possible to correct the colorimetric value based on the invariable component of the spectral distribution depending on the observation condition and the component corresponding to the spectral distribution of the light source under the second observation condition.

And for the eighth aspect of the invention, the spectral distribution data may be computed based on the colorimetric value obtained by measuring the color of the sample specimen for evaluation under the first observation condition and the calorimetric value obtained by measuring the color of the sample specimen for evaluation under the second observation condition, and at this time the spectral distribution of light irradiated on the object of color measurement under various observation conditions may be acquired based on the calorimetric value acquired by measuring the color on the specified white board under the first observation condition and the calorimetric value acquired by measuring the color on the specified white board under the second observation condition. This will enable to acquire the result of color measurement in the case where the color of the object is measured in a condition close to the observation condition of actually observing the object of color measurement by using the result of color measurement by means of a calorimeter having a light source. As a result, it will be possible to acquire the variable component of the spectral distribution depending on the observation condition formed when the object of color measurement is observed under the second observation condition.

And for the eighth aspect of the invention, the image data are data handled by the first image equipment, and the profile generating device mentioned above may comprise a color conversion profile generating unit for generating color converting profiles stipulating the relationship of correspondence between the image data and the second image data based on the above-mentioned profiles generated and the correlation between the second image data handled by the second image equipment and the calorimetric value outputted by the same.

And according to a ninth aspect of the invention, a printing control device for executing printing by converting a color with reference to a color converting profile wherein; a color converting profile represents data generated by acquiring the colorimetric value obtained by measuring under a first observation condition a color of an output result based on an image data handled by a first image equipment, converting this calorimetric value into a calorimetric value acquired by measuring the color of the output result under a second observation condition, correlating the converted calorimetric value with the image data mentioned above, and defining a correlation between the image data and a second image data based on this correlation and the correlation between the second image data handled by the second image equipment and the calorimetric value of its output.

The various devices mentioned above include various aspects such as that they may be operated with other methods in the state of being incorporated into an equipment. For example, they may be applied as a printing system having a printing control device and a printing device. And the above-mentioned devices may put a controlling program into operation, and may be applied as a program, a computer-readable recording medium wherein the program is recorded, or a program product. And they have similar effects and actions.

BRIEF DESCRIPTION OF THE DRAWINGS

FIG. 1 is an illustration describing roughly the method of computing the spectral distribution relating to the present invention.

FIG. 8 is an illustration describing a case of taking into account dependence on angle.

DETAILED DESCRIPTION

Figure 2:
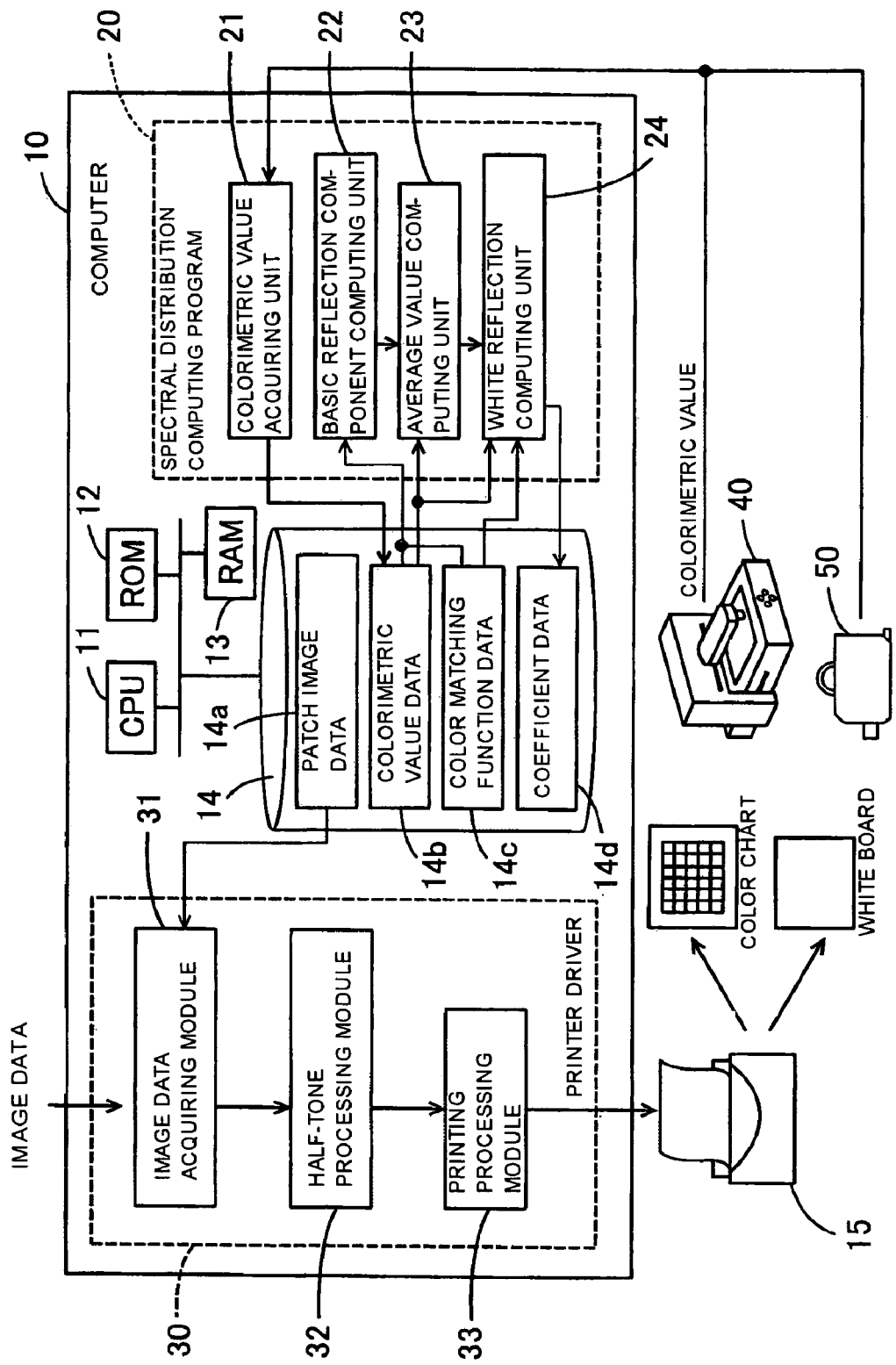
FIG. 2 is a block diagram showing a computer for computing correction values.

The embodiments of the present invention will be described according to the following order.

(1) The first embodiment
   (1-1) Outline of the computing process of spectral distribution
   (1-2) Devices and process of computing spectral distribution (2) The second embodiment
   (2-1) Printing controlling process
   (2-2) Color converting profile generating process
   (2-3) Spectral distribution computing process (3) The third embodiment (4) Other embodiments (1) THE FIRST EMBODIMENT (1-1) Outline of the Computing Process of Spectral Distribution FIG. 1 is an illustration describing roughly the method of computing the spectral distribution related to the present invention. As this process requires many computing process, and therefore the use of a computer is preferable. And a color chart including a plurality of patches (color chips) is printed as described below, and according to the correction value computed in the present invention, the correction of colorimetric values is possible, and the generation of a color conversion table based on this correction enables to reproduce faithfully the appearance of color under the actual observation condition. Therefore, it is preferable that the printer for printing the color chart mentioned above is a printer that prints based on the color conversion table mentioned above, and for the half-tone processing described below, it is necessary to adopt the same algorithm as the half-tone processing adopted by the printer.

The object of the present invention is to correct the calorimetric value acquired by the color measurement under the first observation condition and to acquire the same calorimetric value as the one acquired by the color measurement under the second observation condition. Generally, as color measurements undertaken under different observation conditions produce different colorimetric values, a difference in the calorimetric values acquired under both conditions has appeared. According to the present invention, the factors that contributed to generate this difference are analyzed, and the variable components of the spectral distribution depending on the observation condition are computed to enable the correction of difference mentioned above.

The embodiment shown in FIG. 1 adopts the observation condition of an automatic calorimeter with built-in light source as the first observation condition and the observation condition of a calorimeter without built-in light source as the second observation condition. And the variable component of the spectral distribution depending on the observation condition is computed based on the calorimetric values acquired in both cases. FIG. 1 is a descriptive illustration describing the basic concept for computing the variable component of the spectral distribution depending on the observation condition. The calorimeter 40 has a built-in light source, and can measure the color of the object of color measurement such as a color chart placed on the table for manuscript. And the sensor of the calorimeter 40 can slide on a plane parallel with the table for manuscript and can automatically measure the color of the object at a plurality of points determined in advance.

The colorimeter 50 does not incorporate a light source, and measures the color of the object of color measurement by setting the manuscript within the field of vision of the sensor of the colorimeter 50. To change the object of color measurement on this calorimeter 50, it is necessary to move the desired object of color measurement within the field of vision of the sensor of the calorimeter 50. And as the calorimeter 50 has no built-in light source, it is necessary to measure the color of the object of color measurement while the object of color measurement is irradiated from the surrounding environment. The object of color measurement may be illuminated by a prescribed light source or sources provided. However, even in this case, the object of color measurement may be irradiated by light from many directions.

To produce a color conversion table referred to for printing with a printer, normally the color of a large number of patches (for example, 1,000 patches) is measured. Therefore, for measuring the color of such a large number of patches, it is troublesome and unrealistic to select manually the objects of color measurement and execute successively the operation of color measurement. Accordingly, in a color measurement operation executed in order to generate a color conversion table, an automatic calorimeter such as the calorimeter 40 without any built-in light source must be used. However, an automatic calorimeter such as the calorimeter 40 has a built-in light source, and the observation angle (angle between the perpendicular line on the object of observation and the sensor of the colorimeter 40) is specified.

On the other hand, when a print is actually observed, the observer observes not only light emanating from a specific light source, but observes light emanating from many angles and reflected by the print, and the light source and observation angle are not limited. Therefore, a calorimeter without any built-in light source such as the colorimeter 50, and whose light source and observation angle is not limited can measure light in a condition closer to the observation condition of actually observing the print. Therefore, in the present invention, the color of a large number of patches is measured by means of a colorimeter 40, and the result of color measurement is corrected so that the result of color measurement may be acquired by means of a calorimeter 50.

Specifically, the variable component of the spectral distribution depending on the observation condition as mentioned above is computed in order to acquire the amount of correction thereof. However, the applicant of the present application found that the there is a certain trend in the spectral distribution of prints as a result of the color measurement of prints conducted with a calorimeter 40 and a calorimeter 50. In other words, we found that the spectral distribution acquired by a calorimeter 50 is larger than that acquired by a calorimeter 40 almost over the whole wavelength and that its spectral distribution is approximate to the linear coupling of color-matching functions. We also found that, by multiplying the linear coupling of color-matching functions by a constant dependent on the observation condition, different spectral distribution for each observation condition can be expressed.

In other words, since the observation condition for the colorimeter 40 is the first observation condition, the light source and observation angle are specified under the first observation condition. However, it is difficult to precisely specify the light source and observation angle under the second observation condition with the calorimeter 50. Therefore, as the second observation condition, a plurality of conditions with different types of light source and different angles to the object of color measurement can be assumed. However, it is possible to correct colorimetric values in spite of such changes in conditions. Incidentally, the observation conditions of the object of color measurement include the condition of the object of color measurement itself. In other words, the spectral distribution can change depending on the type of printing medium or color material used for printing the object of color measurement. And as changes in spectral distribution depending on the observation conditions mentioned above are greater in pigment than in dyes, the present invention can produce greater effect when the pigment ink is chosen as the object of color measurement.

We assume that, when a color chart is observed under the second observation condition in order to acquire the variable component of spectral distribution depending on the observation condition, the spectral distribution of the color chart is the sum of the spectral distribution independent of the observation conditions (hereinafter referred to as "basic reflection component") and the spectral distribution dependent on the observation conditions. This assumption is based on the fact that the spectral distribution acquired by the colorimeter 50 is larger than that acquired by the colorimeter 40 over almost the entire wavelength. And as the component of spectral distribution depending on the observation conditions exists over almost the entire wavelength of visible light, hereinafter we will refer to this spectral distribution as the "white reflective component."

Incidentally, the result of color measurement by the colorimeter 50 (tristimulus value) is shown by the equation (1):

[Equation 1]

$$X_{2p} = K_m \Sigma R_{2p}(\lambda) \cdot \bar{x}(\lambda) \cdot \Delta\lambda$$

$$Y_{2p} = K_m \Sigma R_{2p}(\lambda) \cdot \bar{y}(\lambda) \cdot \Delta\lambda$$

$$Z_{2p} = K_m \Sigma R_{2p}(\lambda) \cdot \bar{z}(\lambda) \cdot \Delta\lambda$$

$$K_m = 638 \ [lm/W] \quad (1)$$

In this equation, the left side represents a tristimulus value, $R_{2p}(\lambda)$ represents a spectral distribution acquired by measuring the colors of the color chart by means of the colorimeter 50, and $x(\lambda)$, $y(\lambda)$ and $z(\lambda)$ with a—superposed respectively thereon are color-matching functions. The coefficient $k_m$ is the maximum visual sensitivity (Refer: Shikisai Kogaku [Chromatics] by Noboru Ohta, Tokyo Denki University Press, p. 24), and $\Delta\lambda$ represents the sampling interval on the calorimeter.

The introduction of the above assumption into this equation results in the following equation (2).

[Equation 2]

$$Y_{2p} = K_m \Sigma R_{2w}(\lambda) \cdot (R_p(\lambda) + R_M(\lambda)) \cdot \bar{y}(\lambda) \cdot \Delta\lambda \quad (2)$$

In this equation, $R_{2W}(\lambda)$ represents the spectral distribution acquired by measuring the color of the white board by the calorimeter 50, and $R_p(\lambda)$ represents the spectral distribution of the above-mentioned basic reflection component, and $R_M(\lambda)$ represents the spectral distribution of the white reflective component mentioned above. The other letters represent similar items as in the preceding equation (1). And similar description applies to X and Z of the tristimulus values.

Incidentally, generally the tristimulus values for expressing objectively colors are computed by computing for each wavelength the product obtained by multiplying the spectral distribution of the light source by the spectral distribution of the object of color measurement and by multiplying again the product by the color-matching function and adding the products. In the present embodiment, however, as the color of the objects of measurement is measured without specifying the spectral distribution of the light source, the spectral distribution acquired by the calorimeter 40 and 50 is equal to the product of multiplying the spectral distribution of the light source by the spectral distribution of the object of color measurement. Accordingly, the spectral distribution of the light irradiated on the object of color measurement is acquired by measuring the color of the white board. In other words, the white board is a sample specimen having almost constant reflectance across the entire wavelength of visible rays, and the measurement of color of the white board enables to acquire the spectral distribution of light irradiated on the object of color measurement. Therefore, $R_{2W}(\lambda)$ in the above equation (2) is equivalent to the spectral distribution of the light source under the second observation condition.

Assuming that the luminance $Y_{2p}$ of the tristimulus values under the second observation condition as shown in the above equation (2), the luminance $Y_{2p}$ under the second observation condition can be considered, as shown in FIG. 1, to be the sum of the luminance $Y_p$ attributable to the basic reflection component and the luminance $Y_M$ attributable to the white reflective component.

In the present embodiment, we assumed that the luminance $Y_M$ attributable to the white reflective component is the product obtained by multiplying the sum of color-matching functions x ($\lambda$), y($\lambda$) and z ($\lambda$) by the coefficient $k_W$. In other words, the white reflective component is a component formed when the color of a print or prints is measured under the condition of observing reflected light irradiated in many directions when the object of color measurement is irradiated with light from many directions, and this can be visually recognized when the print is actually observed. Therefore, the applicant of the present application considered that the dependence on wavelength expressed by the linear coupling of color-matching functions corresponding to the sensitivity of the human eyes will be close to the dependence on wavelength of the white reflective component and adopted the above assumption. When the calorimetric values acquired by the calorimeter 40 and the calorimeter 50 are different on the prints actually printed by pigment, it is known that the colorimetric values acquired by the calorimeter 50 can be described by reflecting the spectral distribution determined based on the above assumption.

This assumption may be expressed as shown in the following equation (3).

[Equation 3]

$$Y_M = K_m \Sigma R_{2w}(\lambda) \cdot k_w \cdot (\bar{x}(\lambda) + \bar{y}(\lambda) + \bar{z}(\lambda)) \cdot \Delta\lambda \quad (3)$$

In other words, the above $R_M(\lambda)$ is defined as being equal to $k_w(x(\lambda) + y(\lambda) + z(\lambda))$, and the other letters represent similar items as in the preceding equation (2).

On the other hand, since the luminance $Y_M$ attributable to the white reflective component is equal to $Y_{2p} - Y_p$, the value of the luminance $Y_M$ attributable to the white reflective component can be computed by computing the difference with $Y_{2p}$ actually measured and $Y_p$ estimated from the calorimetric value acquired by the calorimeter 40. Therefore, if it is possible to determine the coefficient $k_w$ in such a way that the luminance $Y_M$ attributable to the white reflective component and the above equation (3) may be equal, we can consider that the spectral distribution of the white reflective component can be acquired.

Incidentally, in the present embodiment, in order to determine the coefficient $k_W$, the color of the sample specimen for evaluation and that of the white board is measured under the first observation condition and the second observation condition to acquire the first colorimetric value and the second calorimetric value. In the present embodiment, the sample specimen for evaluation is a color chart wherein a plurality of patches are printed by the printer. And in FIG. 1, the spectral distribution acquired by measuring the colors of the color chart by the calorimeter 40 under the first observation condition is shown by $R_{1p}(\lambda)$, and the spectral distribution acquired by measuring the colors of the white board by the calorimeter 40 under the first observation condition is shown by $R_{1W}(\lambda)$.

And the spectral distribution acquired by measuring the colors of the color chart by the calorimeter 50 under the second observation condition is shown by $R_{2p}(\lambda)$, and the spectral distribution acquired by measuring the colors of the white board by the colorimeter 50 under the second observation condition is shown by $R_{2W}(\lambda)$. Obviously, it is possible to acquire tristimulus values by multiplying the spectral distribution by the color-matching functions for each wavelength and adding the products thereof. In the present invention, all that is required is to determine the spectral distribution of the white reflective component based on these results of color measurement, and various methods can be adopted as long as the spectral distribution of the white reflective component can be determined. And we will describe in details further below the specific examples of operation for this purpose.

When the spectral distribution of the white reflective component can be acquired as described above, it will be possible to acquire the post-correction value (the calorimetric value when the color of any optional print is measured by the colorimeter 50) from the calorimetric value acquired by measuring the color of any optional print by the colorimeter 40 and the calorimetric value acquired by measuring the color of the white board by the calorimeter 50. In other words, the post-correction value Y' can be computed by the following equation (4).

[Equation 4]

$$Y' = K_m \sum R_{2w}(\lambda) \cdot \left( \frac{R_1(\lambda)}{R_{1w}(\lambda)} + k_w \cdot (\bar{x}(\lambda) + \bar{y}(\lambda) + \bar{z}(\lambda)) \right) \cdot \bar{y}(\lambda) \cdot \Delta\lambda \quad (4)$$

In this equation, $R_{1w}(\lambda)$ represents a spectral distribution acquired by measuring the color of the white board by the colorimeter 40, and $R_1(\lambda)$ is a spectral distribution acquired by measuring the color of any optional print by the calorimeter 40, and the other letters represent similar items as in the preceding equation (3).

Incidentally, in the present invention the fact that the equation (4) contains not only $(R_1(\lambda)/R_{1W}(\lambda))$ representing the spectral distribution of the basic reflection component but also $k_W(x(\lambda)+y(\lambda)+z(\lambda))$ representing the spectral distribution of white reflective component is important. In other words, if the variable component of the spectral distribution due to the fact that the observation condition is different can be described only by variations in the light source, there is no need to include the spectral distribution of the white reflective component in the equation (4), and nothing more than the multiplication of $R_{2W}(\lambda)$ corresponding the spectral distribution of the light source under the second observation condition by the spectral distribution of the basic reflection component should be required.

However, actually the luminance Y' under the second observation condition must be computed by adding the spectral distribution of the white reflective component to the spectral distribution of the basic reflection component. Otherwise, no correct correction can be made. This is because white reflective component can be formed on prints printed with a printing material containing pigment under the impact of observation angle and the like in addition to the difference in light source. Therefore, we can consider that the spectral distribution of the white reflective component in the present embodiment is a variable spectral distribution depending on the observation condition.

Incidentally, in the present embodiment, the luminance attributable to the white reflective component, in other words, the correction value is computed by using the luminance Y of tristimulus values. Obviously, X or Z of the tristimulus values can be used. And according to the present invention, the correction value depending on the observation condition regarding the tristimulus values themselves (the result acquired by adding the values for each wavelength) is not computed, but the variable spectral distribution depending on the observation condition likewise is computed. Therefore, once the spectral distribution is determined, not only luminance Y but also X and Z can be correctly corrected. As a result, it will also be possible to correct hue and color saturation. Furthermore, as the spectral distribution of the white reflective component is obtained by multiplying the known color-matching functions by the coefficient $k_W$, even when the light source and the like have changed in the second observation condition, it will be possible to easily correct by following the difference in the observation condition by changing the coefficient $k_W$.

(1-2) Device and Operation for Computing Spectral Distribution:

We will describe below in details the device and operation for applying the method of computing the spectral distribution mentioned above. FIG. 2 is a block diagram showing the configuration of a computer for computing the coefficient $k_W$ mentioned above, and FIG. 3 is a flowchart showing the operation for computing the coefficient $k_W$.

The computer 10 includes a CPU 11 constituting the nuclei of computing operation, and this CPU 11 controls the whole computer 10 through a system bus. The system bus is connected with a ROM 12, a RAM 13, a hard disk 14 and a USB I/F, a CRT I/F and an input device I/F not shown in the figure.

The hard disk 14 stores an operating system (OS), a spectral distribution computing program 20 for computing the coefficient $k_W$, a printer driver 30 for printing patches and the like as software, and these software are transferred from time to time by the CPU 11 to the RAM 13 at the time of execution. The CPU 11 executes various programs under the control of the OS by accessing from time to time the RAM 13 as a temporary work area.

The input device I/F is connected with a keyboard and a mouse not shown as operating input devices. And the CRT I/F is connected with a display for displaying. Therefore, the computer 10 receives the operation details by the keyboard and the mouse, and can display various types of information on the display. And the USB I/F is connected with the printer 15, so that the images may be printed based on the data outputted by the computer 10. Obviously, as the I/F for connecting with the printer 15, various types of I/F such as a parallel I/F, a serial I/F, SCSI and the like can be adopted.

And the computer 10 is connected with a calorimeter 40 and a calorimeter 50 through an interface not shown in the figure, and the calorimeter 40 and the colorimeter 50 measure the color of various patches on the color chart printed by the printer 15 and supply the calorimetric values of their spectral distribution, the tristimulus values and the like to the computer 10.

The above-mentioned spectral distribution computing program 20 includes a calorimetric value acquiring unit 21, a basic reflection component computing unit 22, an average value computing unit 23 and a white reflective component computing unit 24. And the above-mentioned printer driver 30 includes an image data acquiring module 31, a half-tone processing module 32, and a printing processing module 33. In the present embodiment, these programs operate as follows to compute the coefficient $k_W$.

Figure 3:
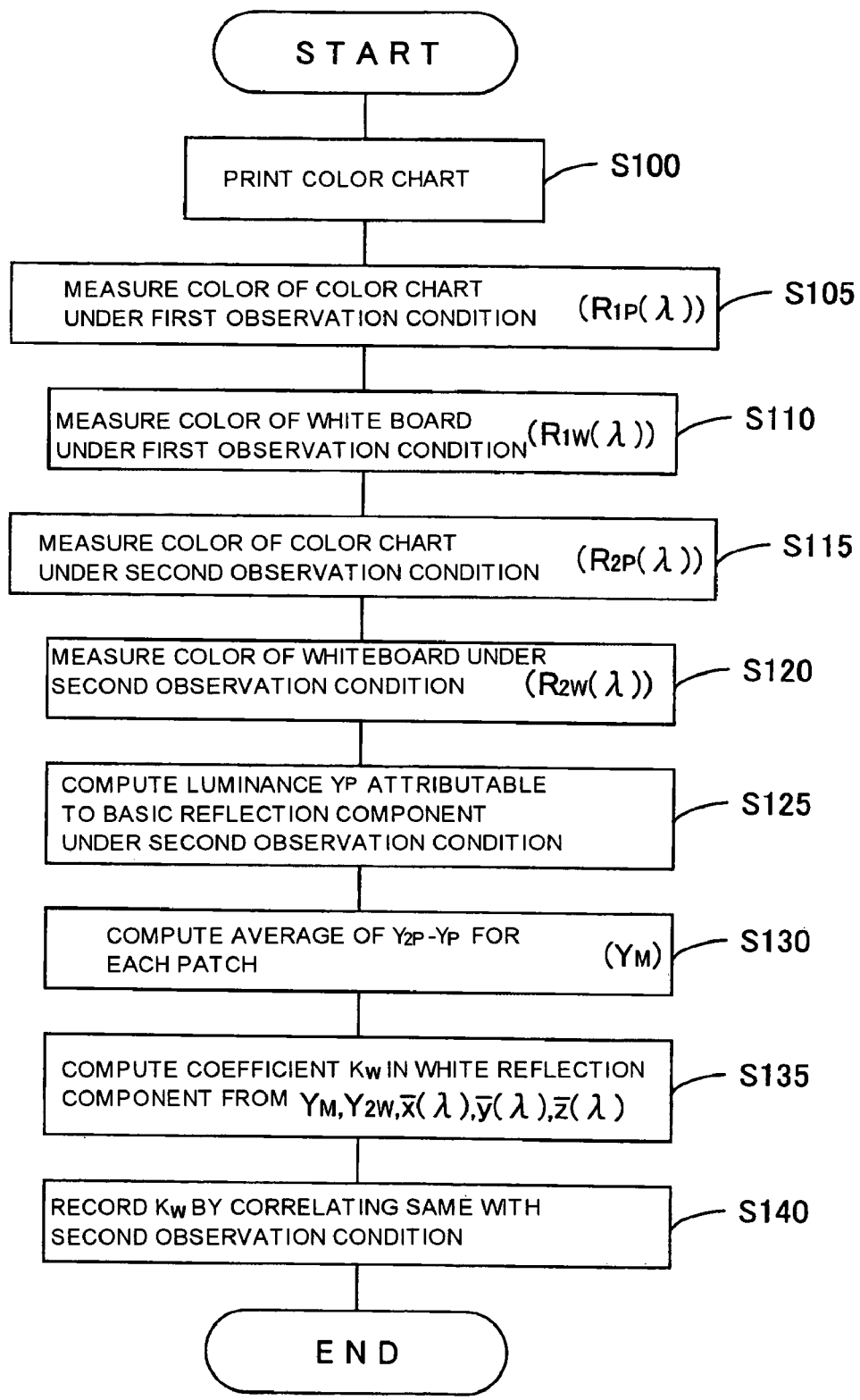
FIG. 3 is a flowchart showing the process of computing the coefficient $k_W$.

The printer driver 30 prints a color chart in the Step S100 of FIG. 3. The color chart consists of a plurality of patches representing the patch images of the objects of color measurement. The hard disk 14 records in advance patch image data 14a for printing a plurality of patches assembled on a piece of printing paper to form a color chart. The image data acquiring module 31 acquires the patch image data 14a to print the color chart. Incidentally, in the present embodiment, the patch image data 14a are data specifying the amount of ink used for each ink color by the printer 15 and expressing by gradation the amount of ink used for each color for a plurality of picture elements. For example, if each of the ink colors of CMYKlclm (cyan, magenta, yellow, black, light cyan, and light magenta) is used on the printer 15, the amount of ink used for each color for each picture element is indicated by color gradation value (for example, 0-255).

When the image data acquiring module 31 acquires patch image data 14a, the data will be delivered to the half-tone processing module 32. The half-tone processing module 32 is a module that carries out half-tone processing wherein half-tone data specifying the amount of ink drops recording the presence or absence of ink drop recording for each picture element by converting the color gradation value for each picture element are obtained. The printing processing module 33 receives the data that had been half-tone processed and rearrange the same in the order of use by the printer 15. In other words, the printer 15 is provided with a jet nozzle array not shown as an ink discharge device, and as a plurality of jet nozzles are arrayed in the supplementary scanning direction in the jet nozzle array, data separated by several picture elements are used in the supplementary scanning direction at the same time.

Accordingly, a rearranging operation is carried out for rearranging in the proper order the data that should be used at the same time among the data arranged in the main scanning direction so that they may be buffered at the same time in the printer 15. After this rearranging operation, the printing processing module 33 adds the prescribed information such as the definition of images to generate printing data and outputs the printing data to the printer 15. The printer 15 prints the image shown by the patch image data 14a based on the printing data and acquires a color chart.

Incidentally, in normal printing operation, in order to ensure that each color indicated by each of the image data expressed in different color systems conforms mutually, a color conversion is carried out by referring to a color conversion table. Therefore, the printer driver 30 for the present embodiment may include a color conversion module for carrying out the color conversion. In this case, as no processing is required by the color conversion module for printing a color chart, the operation may be skipped.

When a color chart has been printed, the calorimetric value acquiring unit 21 of the spectral distribution computing program 20 acquires the colorimetric values (spectral distribution) resulting from the color measurement by the calorimeter 40 and the calorimeter 50 (Step S105-S120). In other words, the calorimeter 40 measures the color of the color chart printed as described above (Step S105), and the calorimeter 40 measures the color of the white board and acquires the first colorimetric value (Step S110). The spectral distribution values acquired are respectively $R_{1p}(\lambda)$ and $R_{1W}(\lambda)$. As this calorimeter 40 has a built-in light source as described above, and the observation angle thereof is determined, the condition of measuring the color of the color chart and the white board with this light source and the observation angle is the first observation condition. Therefore, the Steps S105 and S110 of the present embodiment correspond to the first colorimetric value acquiring process for acquiring the first calorimetric value resulting from the color measurement of the sample specimen for evaluation under the first observation condition.

And the calorimeter 50 also measures the color of the color chart printed as described above (Step S115), and measures the color of the white board and acquires the second calorimetric value (Step S120). The spectral distribution values acquired are respectively $R_{2p}(\lambda)$ and $R_{2W}(\lambda)$. Without any built-in light source, this calorimeter 50 measures the color of the object of color measurement while the same is illuminated with a light sufficient to measure color and at a suitable angle of observation (preferably at an angle of observation of actually observing prints). This observation condition is the second observation condition. Therefore, the Steps S115 and S120 of the present embodiment correspond to the second colorimetric value acquiring process for acquiring the second colorimetric value resulting from the color measurement of the sample specimen for evaluation under the second observation condition.

Incidentally, the calorimetric values resulting from the color measurement described above are recorded in the hard disk 14 (calorimetric value data 14b). And the calorimeter 40 and the calorimeter 50 measure the spectral distribution of the objects of color measurement. Obviously, it is possible to compute easily the tristimulus values by multiplying the color-matching functions for each wavelength and summing up the products. In the present embodiment, the hard disk 14 records in advance the color-matching function data 14c showing color-matching functions for this operation.

Then, the basic reflection component computing unit 22 computes the luminance $Y_p$ attributable to the basic reflection component by referring the calorimetric value data 14b and the color-matching function data 14c (Step S125). Specifically, the luminance $Y_p$ is computed by the following equation (5).

[Equation 5]

$$Y_p = K_m \sum R_{2w}(\lambda) \cdot \frac{R_{1p}(\lambda)}{R_{1w}(\lambda)} \cdot \bar{y}(\lambda) \cdot \Delta\lambda \qquad (5)$$

In this equation, $R_{2W}(\lambda)$ represents the spectral distribution acquired by measuring the color of the white board by the colorimeter 50 (Step S120), $R_{1W}(\lambda)$ represents the spectral distribution acquired by measuring the color of the white board by the calorimeter 40 (Step S110), $R_{1p}(\lambda)$ represents the spectral distribution acquired by measuring the color of a color chart by the colorimeter 40 (Step S105), and the other letters represent the same thing as in the preceding equation (1). Incidentally, as the spectral reflectance $R_{1p}(\lambda)$ can be acquired for each patch on the color chart, the luminance $Y_p$ is computed for each patch contained in the color chart printed in the Step S100 above.

And in the equation (5) above, $R_{1p}(\lambda)/R_{1W}(\lambda)$ corresponds to the spectral distribution (basic reflection component) of each patch itself. In other words, as the spectral distribution $R_{1p}(\lambda)$ acquired by measuring the color of the patch under the first observation condition is equal to the product obtained by multiplying the spectral distribution of the light source by the spectral distribution of the patch itself, the distribution corresponding to the spectral distribution of the patch itself can be acquired by normalizing the same by $R_{1W}(\lambda)$ corresponding to the spectral distribution of the light source under the first observation condition. This induction is made possible by the assumption that the white reflection component is generated under the second observation condition and that the white reflection component is not generated under the first observation condition. Thus, once the spectral distribution of the patch itself is obtained, it will be possible to compute the luminance $Y_p$ by using this spectral distribution and $R_{2W}(\lambda)$ corresponding to the spectral distribution of the light under the second observation condition.

The average value computing unit 23 computes the average for every plurality of patches regarding the luminance $Y_M$ attributable to the white reflection component (Step S130). Incidentally, here, the luminance $Y_M$ is considered as the difference between the luminance $Y_{2p}$ and the luminance $Y_p$. The luminance $Y_{2p}$ is a value computed by the equation (1) from the calorimetric value of the Step S115, and the luminance $Y_p$ is a value computed by the Step S125.

The applicant of the present application computed the luminance $Y_M$ by changing the type of light source under the second observation condition with regards to the patches printed with a pigment ink. As a result, we found that the light source dependence of the luminance $Y_M$ is small, and can be considered as almost constant irrespective of the light source. However, the quasi constancy irrespective of the light source refers to the luminance $Y_M$ and does not mean that the spectral distribution of the white reflection component is almost constant irrespective of the light source. In other words, the luminance $Y_M$ is computed by adding the product of multiplying the spectral distribution of the light source, the spectral distribution of the white reflection component and the color-matching function for each wavelength. However, any change in the light source causes the spectral distribution of the light source to change, and accordingly the spectral distribution of the white reflection component changes. And the resulting luminance $Y_M$ sometimes becomes almost constant irrespective of the light source.

The white reflection component computing unit 24 computes the coefficient $k_W$ in the white reflection component from the luminance $Y_M$ and the luminance $Y_{2W}$ computed in the Step S130 (the luminance acquired by a computing similar to the equation (1) from the spectral distribution $R_{2W}(\lambda)$ acquired by the color measurement in Step S120) and the color-matching functions (Step S135). In the present embodiment, the coefficient $k_W$ will be computed based on the following computing.

In other words, the luminance $Y_M$ is expressed by the following equation (6), and the luminance $Y_w$ of the white board resulting from the color measurement under the second observation condition is expressed by the following equation (7):

[Equation 6]

$$Y_M = K_m \Sigma R_{2w}(\lambda) \cdot k_w (\bar{x}(\lambda) + \bar{y}(\lambda) + \bar{z}(\lambda)) \cdot \Delta\lambda \quad (6)$$

[Equation 7]

$$Y_{2w} = K_m \Sigma R_{2w}(\lambda) \cdot \bar{y}(\lambda) \cdot \Delta\lambda \quad (7)$$

The white board is a sample specimen having an almost constant reflectance over the entire wavelength of the visible light, and on the assumption that the spectral distribution $R_{2W}(\lambda)$ is the constant $r_W$ in the equations above (6) and (7), it is possible to modify the equations (6) and (7) respectively as the equations (8) and (9).

[Equation 8]

$$Y_M = K_m r_w k_W \Sigma (\bar{x}(\lambda) + \bar{y}(\lambda) + \bar{z}(\lambda)) \cdot \bar{y}(\lambda) \cdot \Delta\lambda \quad (8)$$

[Equation 9]

$$Y_{2w} = K_m r_w \Sigma \bar{y}(\lambda) \cdot \Delta\lambda \quad (9)$$

Upon the arrangement in order of the equation by deleting $r_W$ based on the two equations above, the coefficient $k_W$ can be expressed as the following equation (10).

[Equation 10]

$$k_W = \frac{Y_M}{Y_{2w}} \cdot \frac{\sum \bar{y}(\lambda) \cdot \Delta\lambda}{\sum (\bar{x}(\lambda) + \bar{y}(\lambda) + \bar{z}(\lambda)) \cdot \bar{y}(\lambda) \cdot \Delta\lambda} \quad (10)$$

This equation contains only the computed values or already known functions such as luminance $Y_M$, luminance $Y_{2w}$ and color-matching functions, it is possible to compute the coefficient $k_w$ by substituting the computed value and summing up the value for each wavelength based on the color-matching function. The operations of Steps S125-S135 as described above correspond to the spectral distribution computing process for computing the variable component of the spectral distribution depending on the observation conditions. The white reflection component computing unit 24 computes the coefficient $k_W$ based on the equations above, correlates the coefficient $k_w$ with the data showing the second observation condition in the Steps S115 and S120, for example the data showing the type of light source, the printing medium and the type of coloring material used for printing and records the same in the hard disk 14 as the coefficient data 14d (Step S140).

Incidentally, the light source cannot be clearly specified in proceeding to the measurement under the second observation condition and the measurement in the calorimeter 50. In other words, the calorimeter 50 has no light source, and even if the object of color measurement is illuminated with a specified light source, the object of color measurement will be irradiated with a light other than this light source. Therefore, in addition to correlating the coefficient $k_w$ with the type of light source, the light source may be indicated by specifying the surrounding environment, for example, the color temperature of the light source, weather such as fine or cloudy sky and the like. Obviously, the main light source used for measuring color with a calorimeter 50 may be indicated as the observation condition.

Once the coefficient data 14d showing the coefficient $k_w$ is acquired as shown above, thereafter it will be possible to correct the colorimetric value under the first observation condition and acquire the calorimetric value under the second observation condition by referring this coefficient data 14d and computing the equation (4) above. Incidentally, as the equation (4) contains the spectral distribution $R_{1W}(\lambda)$ acquired by measuring the color of the white board by the colorimeter 40 and the spectral distribution $R_{2W}(\lambda)$ acquired by measuring the color of the white board by the calorimeter

50, it is preferable that the coefficient data 14d above include these data. If the coefficient data 14d include these data, it will be possible to acquire the correction value Y' of the equation (4) based only on the spectral distribution $R_1(\lambda)$ acquired by measuring the color of any optional print by means of the calorimeter 40.

(2) THE SECOND EMBODIMENT

Figure 4:
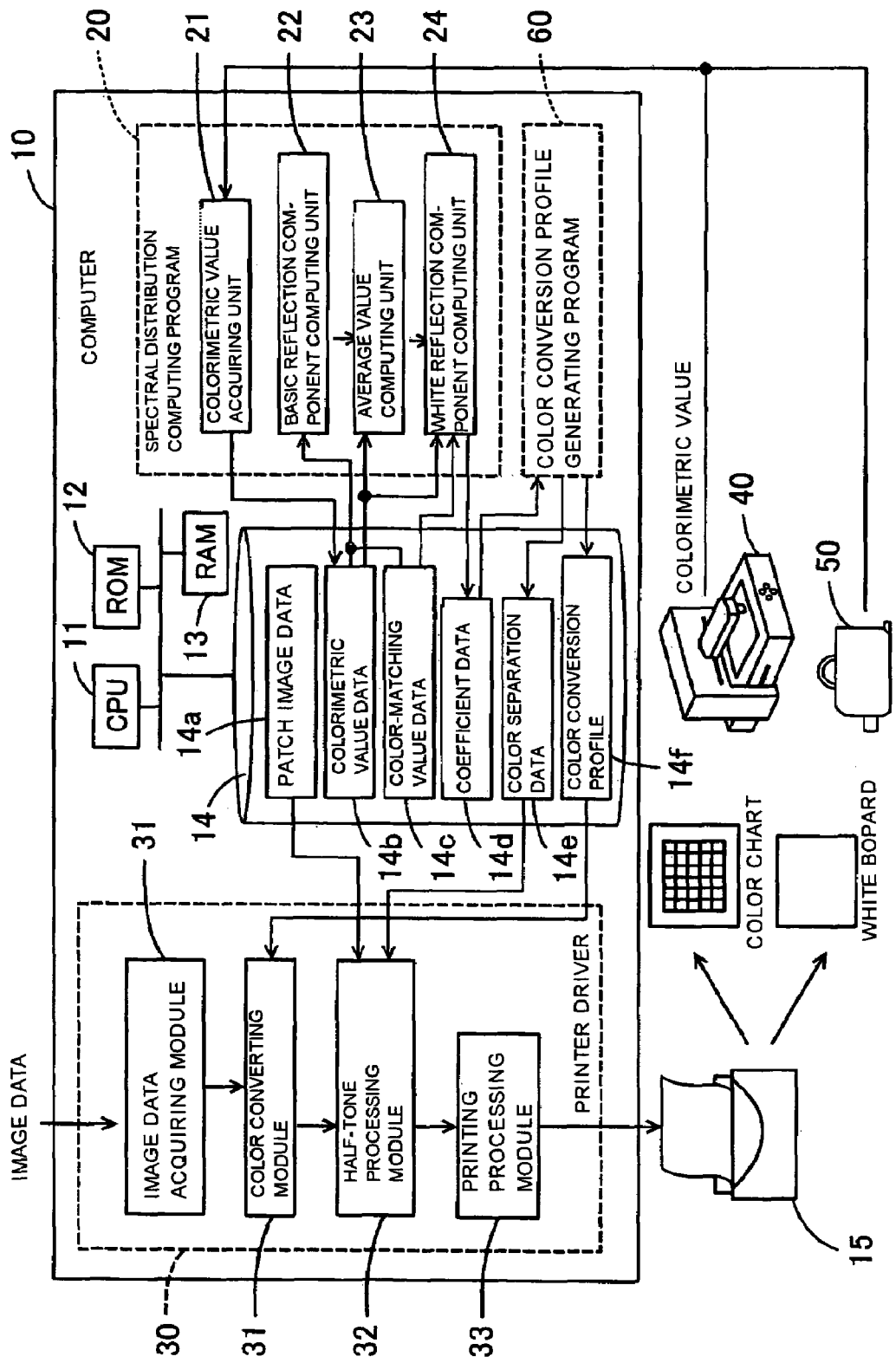
FIG. 4 is a block diagram of the color converting profile generating device related with the present invention.

FIG. 4 is a block diagram showing the color conversion profile generating device related to the present invention. In the present embodiment, a color conversion profile generation device, a spectral distribution computing device and a printing control device are realized in an integral computer. However, each device may be realized in separate computers. And a plurality of patches are printed based on the post-color separation data described further below, and it is preferable this printing to be carried out by a printer wherein a color conversion profile generated according to the present invention is used. And the half-tone processing described further below must be based on the same algorithm as the half-tone processing adopted by the printer.

(2-1) Printing Control Operation

The computer configured as described above can compute spectral distribution, generate color conversion profiles and control printing. And to begin with, we will describe the control of printing and the generation of color conversion profiles. Printing is controlled by the printer driver 30. The printer driver 30 includes an image data acquiring module 31, a color converting module 31, a half-tone processing module 32, and a printing processing module 33. The image data acquiring module 31 is a module for acquiring the image data showing the image of objects for printing.

In the present embodiment, the image data acquired by the image data acquiring module 31 are color image data according to the sRGB standard, wherein each color component of RGB has 256 color gradation levels. In the case where the number of picture elements of the image data acquired is different from the number of picture elements required for printing, the image data acquiring module 31 executes a definition conversion in order to adjust the difference. The color converting module 31 is a module for converting the color system of image data by means of interpolating computing by referring to the color conversion profile 14f stored in the hard disk 14.

The color conversion profile 14f is a table generated by the operation described further below and correlating the RGB data according to the sRGB standard and the CMYKlclm data by a plurality of combinations between them. The color conversion module 31 acquires image data from the image data acquiring module 31 above, and converts any optional sRGB data into the CMYKlclm data by referring to the data described in the color conversion profile 14f by interpolating computing.

When the color converting module 31 converts colors and generates CMYKlclm data, the CMYKlclm data are delivered to the half-tone processing module 32. The half-tone processing module 32 converts the CMYKlclm color gradation values of each dot and acquires half-tone data specifying the presence or absence of ink drop recording for each picture element and the amount of ink drops to be recorded for each picture element.

The printing processing module 33 receives such half-tone data and rearrange them in the order of use by the printer 15. In other words, the printer 15 is provided with a jet nozzle array not shown in the figure as an ink jet device, and as the nozzle array has a plurality of jet nozzles arranged in parallel in the auxiliary scanning direction, data separated by several dots in the auxiliary scanning direction are used at the same time. Accordingly, a rearranging operation is carried out in order to rearrange in the correct order the data that should be used at the same time among the data arranged in the main scanning direction so that they may be buffered at the same time in the printer 15. After this rearranging operation, the printing processing module 33 generates the printing data by adding the specified information such as the definition of the image and the like and outputs the same to the printer 15. Based on the printing data, the printer 15 prints the image shown by the image data above, and acquires the output image.

The color conversion profile 14f is generated based on the result of correction of the calorimetric value by the coefficient data 14d described further below. Therefore, when a printing is carried out taking into account the result of conversion by the color conversion profile 14f, it will be possible to acquire prints with a good reproducibility of color under the actual observation condition of the print. Incidentally, according to the present embodiment, it is possible to print by inputting the CMYKlclm data into the half-tone processing module 32 in order to generate a color conversion profile 14f.

In other words, it is possible to carry out a printing operation by skipping the processing by the color conversion module 31 as required. Obviously, once a color conversion profile 14f is generated, it is no longer necessary to generate the color conversion profile 14f. Therefore, it is possible to adopt a system wherein printing will be carried out jointly by a color conversion profile 14f and a printer driver 30 in a computer without a spectral distribution computing program 20 or a color conversion profile generating program 60. And the use of six ink colors in a printer 15 is an example of system, and the number of ink colors is not limited to six.

Figure 5:
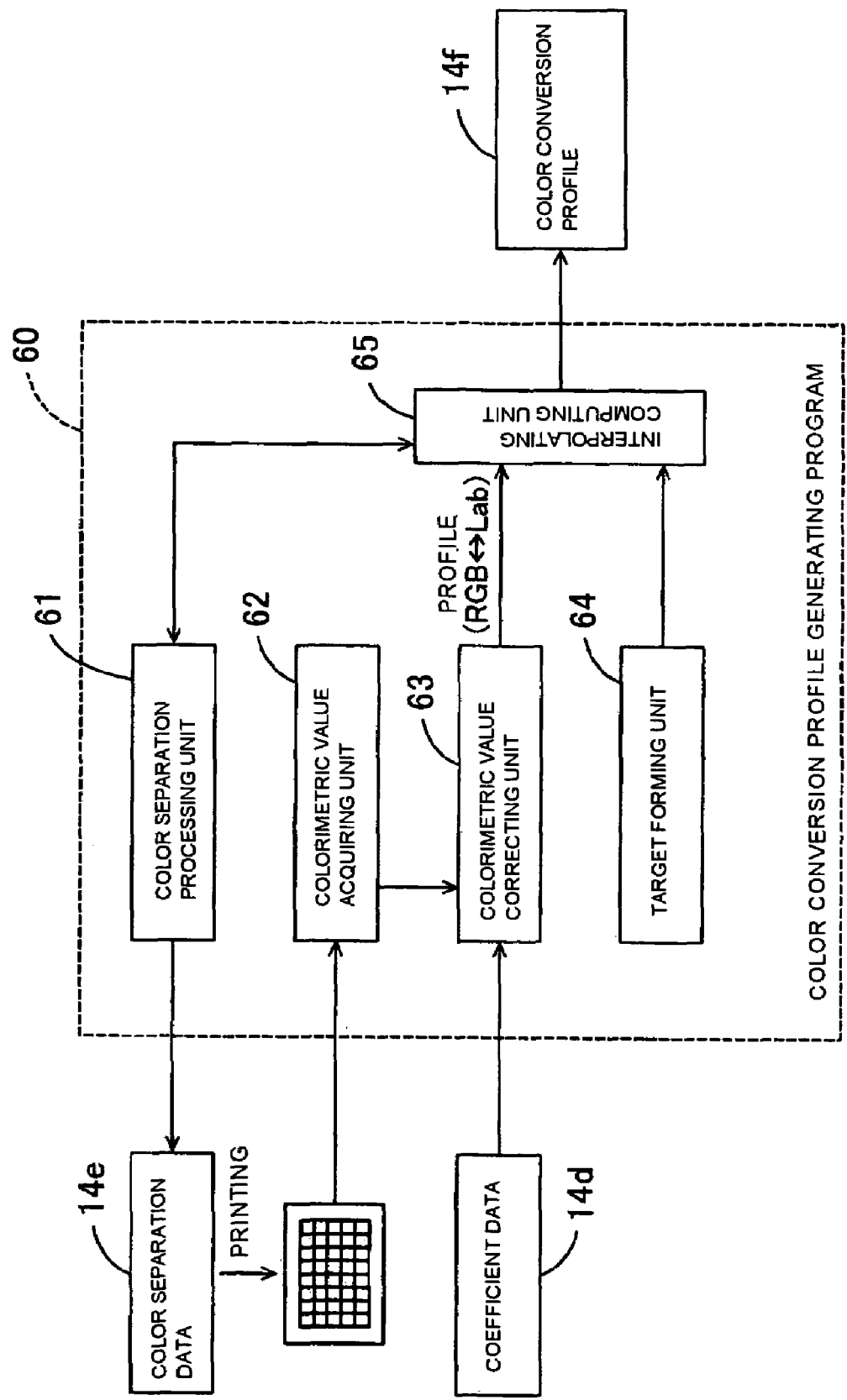
FIG. 5 is a block diagram showing the configuration of the color converting profile generating program.
Figure 6:
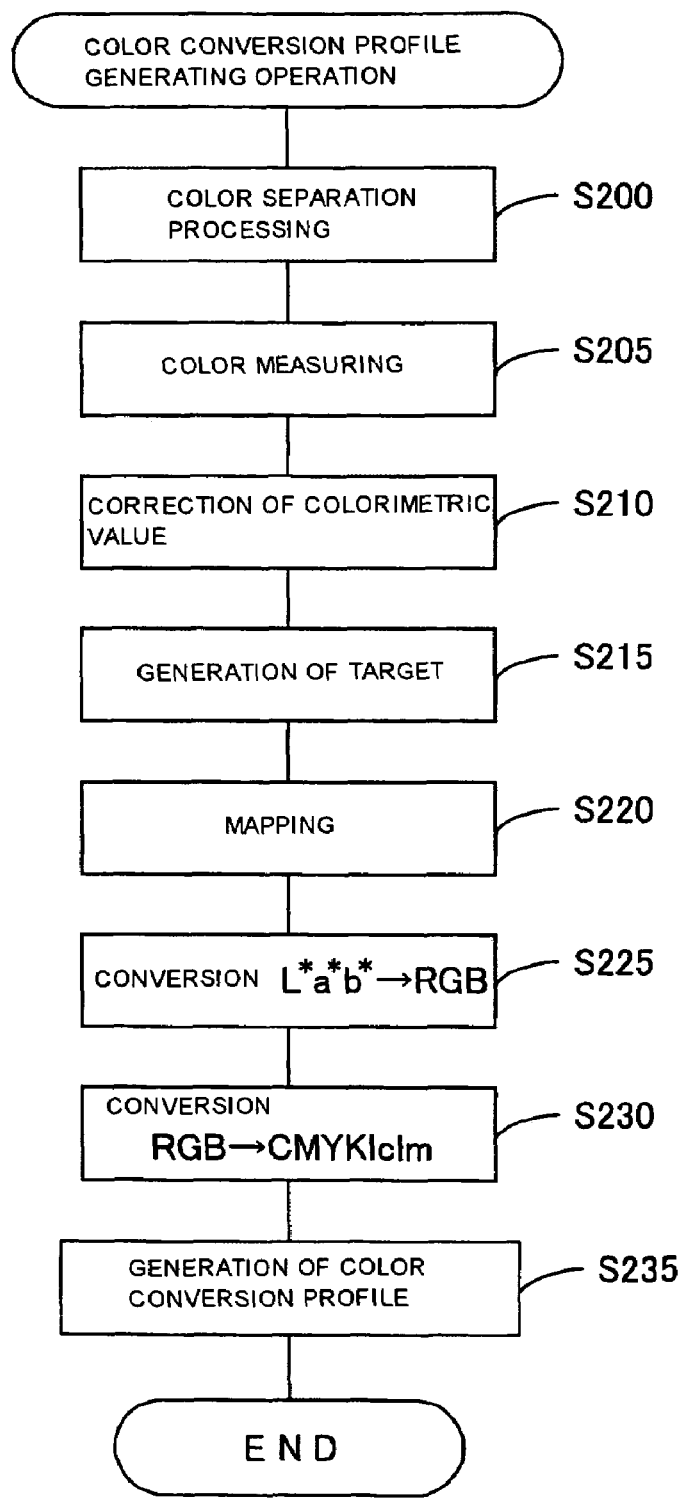
FIG. 6 is a block diagram showing the process of generating a color converting profile.

(2-2) Color Conversion Profile Generating Operation:

FIG. 5 is a block diagram showing the configuration of the color conversion generating program 60, and FIG. 6 is a flowchart showing the operation of generating the color conversion profile. The color conversion profile generating program 60 includes a color separation processing unit 61, a calorimetric value acquiring unit 62, a calorimetric value correcting unit 63, a target generating unit 64 and an interpolating computing unit 65. In this embodiment, initially the color separation processing unit 61, the calorimetric value acquiring unit 62, and the calorimetric value correcting unit 63 jointly generate a profile correlating the image data (CMYKlclm data) and colorimetric data (L*a*b*) handled by the printer 15, and the target generating unit 64 and the interpolating computing unit 65 generate a color conversion profile correlating the sRGB data for outputting the image on the display and the image data handled by the printer 15 based on this profile.

The color separation processing unit 61 converts the three-dimensional color gradation values (RGB: red, green, blue) into the color gradation value for each ink color (CMYKlclm: cyan, magenta, yellow, black, light cyan and light magenta) based on the pre-determined color separation rule in order to specify the patches selected as the objects of color measurement (Step 100). Here, RGB data are adopted as the example of three-dimensional color gradation values, and CMYKlclm data are adopted as the example of six-dimensional color gradation values. There are 256 color gradations for each color component, but the color components and the color gradation value areas are not limited to these.

Here, all that is required is that six-dimensional CMYKlclm data can be acquired from three-dimensional RGB data according to a plurality of rules. In other words, for the six-dimensional CMYKlclm data, the same color can be expressed by a combination of different CMYKlclm color gradation values by combining six colors of CMYKlclm. Therefore, it is difficult to determine unconditionally a combination of ideal CMYKlclm color gradation values for patches likely to be the object of color measurement and corresponding to specific colors without setting any rules. Therefore, when the correlation between the RGB data and the CMYKlclm data is defined by following a plurality of rules, the CMYKlclm data can be easily acquired from the RGB data.

Specifically, as each color of RGB is complementary with each color of CMY, if the color is not strictly defined by its gradation values, it is possible to consider that C=255−R, M=255−G, and Y=255−B, and in this sense the RGB data in the LUT for reference are equivalent to CMY data. Therefore, when the RGB data are considered as equal to the CMY data, an equivalent value a is reduced from each color gradation value of CMY and at the same time C=M=Y=a is substituted by the color gradation value b of K. In addition, the remainder of C and M will be substituted by lc and lm at a fixed percentage.

Incidentally, each color gradation value of CMYKlclm is a data specifying the amount of each ink color used. Accordingly, the color gradation value of CMYKlclm is determined by imposing the restriction of the use of ink, in other words the condition of restricting the weight of ink used for recording per a unit area below a specific weight, and the restriction of ink generation, in other words the condition of limiting the amount of specific ink used in order to make it difficult to produce granular feeling or to reduce difference in the brightness of color. And greater the number of colors that can be expressed by the combination of CMYKlclm inks, more preferable it is for the improvement of the quality of images. Therefore, the color area should be expanded as wide as possible. The rules on color separation are established by taking into account the above elements, and the color separation processing unit 61 converts a plurality of RGB data into CMYKlclm data according to the pre-determined color separation rules (Step S200).

The CMYKlclm data acquired by conversion are correlated with the RGB data, and will be stored in the hard disk 14 as the color separation data 14e. The CMYKlclm data contained in the color separation data 14e will be delivered to the half-tone processing module 32 mentioned above. As a result, a plurality of patches will be printed based on a plurality of CMYKlclm data specified in the color separation data 14e. Incidentally, the RGB data and the CMYKlclm data specified in the color separation data amount respectively to approximately 1,000 and print a large number of patches.

The calorimetric value acquiring unit 62 acquires the colorimetric value (spectral distribution $R_1(\lambda)$) resulting from the color measurement of the plurality of patches by a colorimeter 40 (Step S205). Here, the calorimeter 40 has a built-in light source, and can measure the color of an object of color measurement such as a color chart placed on the manuscript table. And as the sensor of the colorimeter can move on the plane parallel with the manuscript table, the colorimeter can automatically measure at a plurality of positions previously determined. Therefore, even if a large number of patches are printed as described above, their colorimetric value can easily be acquired. The above Step S205 corresponds with the processing by the colorimetric value acquiring unit mentioned above.

When the calorimetric values for the plurality of patches are acquired, the calorimetric value correcting unit 63 acquires the tristimulus values (X'Y'Z') of each patch by correcting the calorimetric values based on the following equation (11) by referring to the above coefficient data 14d, and acquires the L*a*b* values from these tristimulus values (Step S210). Here, the L*a*b* values are computed by the method of computing the spectral distribution described in the first embodiment above.

The Step S210 above corresponds with the operation at the calorimetric value converting unit.

[Equation 11] (11)

$$X' = K_m \sum R_{2w}(\lambda) \cdot \left( \frac{\frac{R_1(\lambda)}{R_{1w}(\lambda)} + k_w \cdot (\bar{x}(\lambda) +}{\bar{y}(\lambda) + \bar{z}(\lambda))} \right) \cdot \bar{x}(\lambda) \cdot \Delta\lambda$$

$$Y' = K_m \sum R_{2w}(\lambda) \cdot \left( \frac{\frac{R_1(\lambda)}{R_{1w}(\lambda)} + k_w \cdot (\bar{x}(\lambda) +}{\bar{y}(\lambda) + \bar{z}(\lambda))} \right) \cdot \bar{y}(\lambda) \cdot \Delta\lambda$$

$$Z' = K_m \sum R_{2w}(\lambda) \cdot \left( \frac{\frac{R_1(\lambda)}{R_{1w}(\lambda)} + k_w \cdot (\bar{x}(\lambda) +}{\bar{y}(\lambda) + \bar{z}(\lambda))} \right) \cdot \bar{z}(\lambda) \cdot \Delta\lambda$$

In this equation, $R_{2w}(\lambda)$ represents a spectral distribution acquired by measuring the color of the white board by the calorimeter 50, $R_{1w}(\lambda)$ represents a spectral distribution acquired by measuring the color of the white board by the calorimeter 40, and $R_1(\lambda)$ represents a spectral distribution acquired in the Step S205, the details of which will be described further below. And $x(\lambda)$, $y(\lambda)$ and $z(\lambda)$ with—superposed thereon represent color-matching functions, the coefficient $K_m$ is the maximum visual sensitivity, and $\Delta\lambda$ represents the sampling interval in the calorimeter.

The coefficient $k_w$ is a value entered in the coefficient data 14d, whose details will be described further down. And in the present embodiment, the spectral distributions $R_{2w}(\lambda)$ and $R_{1w}(\lambda)$ are contained in the coefficient data 14d, and the color-matching functions are recorded in advance on a hard disk 14 as the color-matching function data 14c. Incidentally, the tristimulus values can be converted into the L*a*b* values based on the publicly known equation. The computing of the tristimulus values by correcting as described above will enable to acquire the tristimulus values under the observation condition of actually observing prints (second observation condition), and the generation of a color conversion profile 14f based on this calorimetric value will enable to generate a color conversion profile for matching colors under this observation condition.

Incidentally, by correcting calorimetric values with the help of the calorimetric value correcting unit 63, it will be possible to correlate the L*a*b* values based on the corrected tristimulus values and RGB data before color separation operation in the Step S200. And the correlation between any optional RGB data and CMYKlclm data can be determined by referring to the color separation data 14e or by the operation of the color separation processing unit 61. Therefore, the L*a*b* values based on the corrected tristimulus values and the CMYKlclm data can be correlated.

Therefore, the correlation between the RGB data before color separation operation and the corrected L*a*b* values, or the correlation between the CMYKlclm data and the corrected L*a*b* values are profiles correlating the colorimetric values (L*a*b* values) converted by the present invention and the image data (RGB data or CMYKlclm data). In the present embodiment, the operation of generating profiles correlating the colorimetric values converted by the calorimetric value correcting unit 63 and image data corresponds to the operation in the profile generating unit.

According to this profile, as it is possible to acquire the correlation between the image data handled by the printer 15 and the output colorimetric values based on the image data, then the prescribed target is set and the color conversion profiles are generated. Accordingly, to begin with, the target generating unit 64 sets the sRGB data as the target (Step S215), and proceeds to a color area mapping (Step S220).

In other words, the target generating unit 64 sets sRGB data as the reference point for registering on the color conversion profile as the target. In the present embodiment, each color gradation value area in the sRGB color space is equally divided (for example, divided into 17 equal sections), and the combined value of the acquired color gradation values is considered as the sRGB data of the target. For the sRGB data, as it is possible to acquire the corresponding L*a*b* values by a known equation, the L*a*b* values corresponding to the target mentioned above can be easily acquired.

Accordingly, when the L*a*b* values that can be acquired by all the sRGB data are taken into consideration and are plotted in the L*a*b* space, the color area based on the sRGB data can be grasped by the outline of the same. On the other hand, when the corrected L*a*b* values are plotted in the L*a*b* space, the color areas on the printer 15 can be grasped. Then, the target generating unit 64 proceeds to a color area mapping in such a way that the L*a*b* values corresponding to the sRGB data may be contained in the color area of the printer 15. Of course, other corrections may be carried out in addition to the mapping above. For example, humans tend to remember the color of sky or skin more clearly than the actual color and the colors remembered by humans and the actual colors are different. Therefore, it is possible to correct such colors so that they may approach the colors remembered by humans.

When the mapping as described above is completed, the correlation between the sRGB data and the L*a*b* values are known. Accordingly, a color conversion profile 14f is generated in agreement with the profile acquired in the Step S210. In other words, the interpolating computing unit 65 acquires the L*a*b* values corresponding to the sRGB data of the target. As the RGB data corresponding to these L*a*b* values (the RGB data in the color system before color separation operation in Step S200) is defined in the profile generated by the colorimetric value correcting unit 63, the L*a*b* values are converted into the RGB data by referring to the profile (Step S225).

As the CMYKlclm data corresponding to the RGB data can be acquired by a color separation operation by the color separation processing unit 61, the interpolating computing unit 65 delivers the RGB data to the color separation processing unit 61, and acquires the CMYKlclm data that have been subjected to a color separation processing. In other words, the RGB data are converted into the CMYKlclm data (Step S230). Of course, the RGB data may be converted into the CMYKlclm data by resorting to an interpolating computing by referring to the color separation data 14e mentioned above.

At any rate, the acquired CMYKlclm data are ones for outputting the L*a*b* values corresponding to the sRGB data of the target. Accordingly, the sRGB data of the target are correlated with the CMYKlclm data. This operation is carried out for all the targets, and the data defining the correlation thereof are recorded in the hard disk 14 as the color conversion profile 14f mentioned above (Step S235). In the present embodiment, the operations in the Steps S215-S235 correspond to the operations in the color conversion profile generating unit mentioned above.

(2-3) Computing of Spectral Distribution:

With regards to the color conversion profile 14f generated as described above, due to corrections made based on the variable component of spectral distribution depending on the observation condition in the Step S210 above, it is possible to obtain prints with a good color reproducibility under the observation condition of actually observing prints. This method of computing spectral distribution is described in details in the first embodiment.

When the spectral distribution of the white reflection component is acquired as described for the first embodiment, it is possible to acquire a corrected value (the calorimetric value when the color of any optional print is measured by means of a calorimeter 50) from the colorimetric value acquired by measuring the color of any optional print by means of a calorimeter 40 and the colorimetric value acquired by measuring the color of the white board by a calorimeter 50. In other words, the corrected tristimulus values can be computed by the equation (1) above.

Incidentally, in the present invention, we the correction values depending on the observation condition with regards to the tristimulus values (the sum of all the values for each wavelength) is not computed, but the variable spectral distribution of the correction value depending on the observation condition is computed. Therefore, once the spectral distribution is determined, not only luminance Y but also X and Z can be correctly corrected. As a result, it will be possible to correct hue and color saturation. In addition, since the spectral distribution of white reflection component is equal to the product of multiplying color matching functions by the coefficient $k_w$, it is possible to easily correct by following the difference in observation condition by correcting the coefficient $k_w$ even in the case where the light source has moved under the second observation condition.

As the equation (10) above contains only the computed value or known function such as luminance $Y_M$, luminance $Y_{2W}$ and color-matching functions, it is possible to compute the coefficient $k_w$ by substituting the computed values and summing up the value for each wavelength based on the color-matching functions. The white reflection component computing unit 24 computes the coefficient $k_w$ based on the equation mentioned above, and records the same in the hard disk 14 as the coefficient data 14d (Step S140 of FIG. 3). At this time, the coefficient data 14d above contains the spectral distribution $R_{1w}(\lambda)$ acquired by measuring the color of the white board by the calorimeter 40, and the spectral distribution $R_{2w}(\lambda)$ acquired by measuring the color of the white board by the calorimeter 50. By this, it will be possible to correct the calorimetric value based on the equation (11) above.

Incidentally, according to the present invention, as it is possible to describe variable spectral distribution depending on the observation condition by changing the coefficient $k_w$ for each observation condition, it is possible to compute the spectral distribution for each type of observation condition by carrying out the operation shown in FIG. 5 above while changing the second observation condition. In this case, it is preferable to include the data showing the observation condition (for example, data showing the type of light source, the printing medium and the type of coloring material used in printing) as the coefficient data 14d mentioned above. In this system, it will be possible to acquire colorimetric values under each of the types of observation condition based on the coefficient data 14d matching various observation conditions and the calorimetric values under the first observation condition. Obviously, it is enough to compute coefficient data 14d for the specific observation condition in order to generate a color conversion profile 14f for realizing a good color reproducibility under specific observation conditions. On the other hand, if it is designed in such a way that calorimetric values can be acquired under various observation conditions, the field of use of the system will be further expanded so that the system will be for the general use.

Incidentally, the light source cannot be clearly specified in any measuring using the calorimeter 50. In other words, the calorimeter 50 has no built-in light source, and even if the object of color measurement is illuminated by a specific light source, the object of color measurement will be irradiated with lights emanating from anything other than this light source. Therefore, for specifying the observation condition related with the coefficient data 14d, the light source may be indicated by specifying the surrounding environment, for example, the color temperature of the light source, fine or cloudy sky and other weather conditions in addition to the adaptation to the type of light source. Obviously, the main light source used in measuring with the calorimeter 50 may be indicated as the observation condition.

(3) THE THIRD EMBODIMENT

Once the coefficient data 14d showing the amount of correction is computed as described above, it will be possible to apply the correction method according to the present invention to various cases. For example, it is possible to adopt a system wherein a correction profile is recorded in the colorimeter 40 in advance, and after a measurement is conducted by the calorimeter 40 under the first observation condition, calorimetric values acquired under the second observation condition are outputted.

Figure 7:
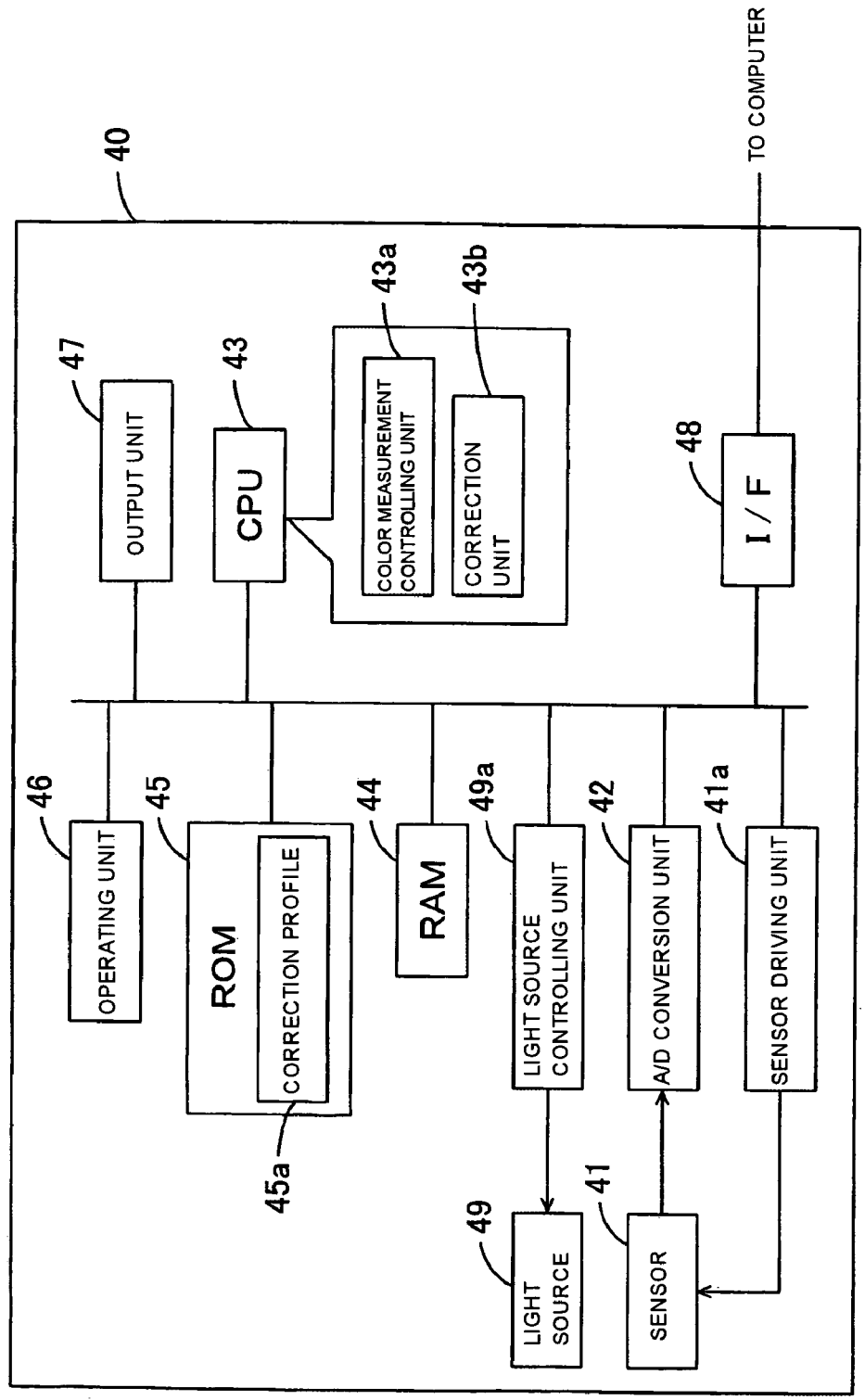
FIG. 7 is a block diagram of a calorimeter having a profile for correction.

FIG. 7 is a block diagram showing the configuration of a calorimeter 40 having a profile for correction. As shown in the figure, the colorimeter 40 includes a sensor 41, a sensor driving unit 41a, A/D converting unit 42, a program executing environment (CPU 43, RAM 44, ROM 45), a user interface (operating unit 46, output unit 47), an interface for connecting with the computer 10 (I/F 48), and an optical system (light source 49, light source controlling unit 49a).

The colorimeter 40 transfers a program not shown recorded in advance in the ROM 45 to the RAM 44, and the CPU 43 executes this program to control various units. In other words, the operating unit 46 is connected with input devices such as buttons and the like not shown, and the CPU 43 acquires the details of operation in the operation unit 46. And the output unit 47 is a display device for outputting the prescribed information, and can guide the operational inputs in the operating unit 46 and display the result of color measurement.

The sensor 41 is designed to be movable in parallel with the surface of the manuscript table not shown of the colorimeter 40, and the sensor driving unit 41a drives the sensor 41 according to the instruction given by the CPU 43 to set the same at a desired position. The displacement of the sensor may be controlled by means of inputs through the operating unit 46, or may be controlled by a pre-determined procedure, and various methods can be adopted in this respect. The light source controlling unit 49a supplies power to the light source 49 according to the instruction of the CPU 43, and switches ON the light source. The light source 49 irradiates the object of color measurement placed on the manuscript table and located within the field of vision of the sensor 41 with light.

The A/D converting unit 42 is driven according to the instruction of the CPU 43 and converts the signals detected by the sensor 41 into digital signals. The CPU 43 detects the spectral distribution of the object of color measurement based on this digital data. The programs relating to the control of color measurement mentioned above among the programs executed by the CPU 43 include the color measurement controlling unit 43a and the correcting unit 43b. The color measurement controlling unit 43a gives instructions to the sensor driving unit 41a and the light source controlling unit 49a as described above, and as a result acquires the digital signals outputted by the A/D converting unit 42. The operation of the color measurement controlling unit 43a of the present embodiment corresponds to the color measuring process for measuring the color of the object of color measurement under the first observation condition.

As this digital signal represents the spectral distribution under the first observation condition, the correcting unit 43b corrects the calorimetric value resulting from the color measurement under the first observation condition based on the spectral distribution. The operation of the correcting unit 43b in the present embodiment corresponds to the calorimetric value conversion process for converting the calorimetric value resulting from the color measurement under the first observation condition into the colorimetric value resulting from color measurement of the object of color measurement under the second observation condition. The ROM 45 records in advance a correction profile 45a for carrying out this correction. The correction profile 45a is a profile data that correlates the colorimetric value acquired under the first observation condition and the colorimetric value acquired under the second observation condition, and various data modes can be adopted as long as both calorimetric values can be correlated.

For example, the tristimulus values under the first observation condition can be computed by substituting $R_{2p}(\lambda)$ in the equation (1) above by the spectral distribution $R_1(\lambda)$ resulting from the color measurement under the first observation condition. On the other hand, the tristimulus values under the second observation condition can be computed by substituting the equation (4) above by (i) this spectral distribution $R_1(\lambda)$, (ii) the coefficient kw showed by the coefficient data 14d above, (iii) the spectral distribution above $R_{1w}(\lambda)$ and (iv) the spectral distribution $R_{2w}(\lambda)$.

Accordingly, when the tristimulus values acquired under the first observation condition and the tristimulus values acquired under the second observation condition are correlated, and this correlation is acquired for a plurality of tristimulus values, the table data for converting tristimulus values can be generated. When such table data are recorded as a correction profile 45a, after the tristimulus values are computed based on the spectral distribution acquired by the color measurement controlling unit 43a, the tristimulus values under the second observation condition can be acquired by an interpolating computing by referring the correction profile 45a.

Of course, correction profiles 45a may include, in addition to the definition of the correlation among a plurality of tristimulus values, a function showing the relationship between the tristimulus values acquired under the first observation condition and the tristimulus values acquired under the second observation condition, or data showing other color systems, for example the correlation of L*a*b* and the like. And the correction profile 45a may be constituted by the coefficient $k_w$ and the spectral distribution $R_{1w}(\lambda)$, spectral distribution $R_{2w}(\lambda)$, color-matching function and the like. In this case, the operations of the color measurement controlling unit 43a correspond with the operations in the calorimetric value acquiring process of acquiring colorimetric values by measuring the color of the objects of color measurement under the first observation condition. And the operations in the correcting unit 43b correspond with the operations in the colorimetric value correcting process for correcting the calorimetric values acquired under the first observation condition into the calorimetric value acquired under the second observation condition.

In any case, the correcting unit 43b corrects the colorimetric values acquired under the first observation condition by referring to the correction profile 45a and acquires the colorimetric values under the second observation condition. Then, the CPU 43 may output the calorimetric value to the outputting unit 47, or may output the same to the computer 10 through the I/F 48. Incidentally, as the coefficient $k_w$ can depend on the second observation condition, for example the type of light source, it is preferable that the correction profile 45a prepare them in advance for each second observation condition. In this case, the entire system is constructed in such a way that the operating unit 46 and the like can specify the second observation condition and the correcting unit 43b refers to the correction profile corresponding to the specified observation condition. As a result, it will be possible to acquire calorimetric values under various observation conditions only through the color measurement by the colorimeter 40.

(4) OTHER EMBODIMENTS

In the present invention, various types of embodiment can be adopted as long as the variable component of spectral distribution depending on the observation condition can be computed or corrections can be executed based on the spectral distribution computed. For example, the computing method for computing the white reflection component constituting a type of variable component of spectral distribution depending on the observation condition mentioned above is not limited to the equation (10) above.

As other methods, it is possible to adopt a way of specifying the coefficient $k_w$ by arithmetic calculation. In other words, the luminance $Y_M$ attributable to the white reflection component is expressed by the equation (3) above, and its value can be computed from the calorimetric value of the sample specimen for evaluation and the white board under the first observation condition and the second observation condition as shown by the Step S130 above. Accordingly, considering that the value computed and the equation (3) as being equal, and by substituting the spectral distribution $R_{2w}(\lambda)$ in the equation (3) by an actual measurement or a constant $r_w$, the unknown numbers can be reduced to only the coefficient $k_w$.

As a result, it will be possible to compute the coefficient $k_w$ by various methods of computing values, and it will be possible to acquire the spectral distribution of the white reflection component mentioned above by the product of multiplying $(x(\lambda)+y(\lambda)+z(\lambda))$ by the coefficient $k_w$ acquired by the computing. Obviously, in the Step S135 of FIG. 3 above, the actual measurement may be used instead of choosing the spectral distribution $R_{2w}(\lambda)$ above as the constant $r_w$.

And, the setup of correcting by referring the amount of correction acquired by the present invention is not limited to the second embodiment above. For example, it is possible to carry out the correction by the computer 10 shown in FIG. 2 above. In other words, after the computer 10 had computed the coefficient data 14d and had recorded the same in the hard disk 14, it is possible to acquire the calorimetric value in the colorimeter 50 based only on the spectral distribution measured by the colorimeter 40 by referring to this coefficient data 14d.

And, in the embodiment mentioned above, the color of the white board was measured also under the first observation condition. However, as the calorimeter 40 set to execute the color measurement under the first observation condition has a built-in light source, it may acquire in advance the spectral distribution of the pre-determined light source. Obviously, in this case, the operation of measuring the color of a white board under the first observation condition becomes unnecessary. Moreover, in the embodiment mentioned above, it was assumed that the spectral distribution of the white reflection component is the product of multiplying $(x(\lambda)+y(\lambda)+z(\lambda))$ by the coefficient $k_w$. Obviously, however, at the time of the linear coupling of color-matching functions, different coefficients may be applied for multiplication of each color-matching function, or other functions depending on the wavelength may be assumed, and various other alternatives may be adopted.

And, in the embodiment described above, we assumed that the coefficient $k_w$ in the spectral distribution of the white reflection component depends on the type of light source, the printing medium used and the type of coloring material used in the printing. Obviously, however, the second observation condition may be defined by including other elements, and the coefficient $k_w$ may be dependent on the other elements. For example, the spectral distribution of the white reflection component may be determined as dependent on the relative positional relationship among the light source, the sample specimen for evaluation and the calorimeter 50.

FIG. 8 is a descriptive illustration illustrating an example of considering the angle between the light source and the sample specimen for evaluation and the angle between the sensor of the calorimeter 50 and the sample specimen for evaluation as the relative positional relationship among the same. In the figure, the angle between the light source and the sample specimen for evaluation is the angle $\phi$ between the perpendicular line of the sample specimen for evaluation (obviously even the color of the white board is measured by the same positional relationship) and the light path from the light source (the straight line linking the light source and the point of observation), and the angle between the sensor and the sample specimen for evaluation is the angle $\theta$ between the perpendicular line of the sample specimen for evaluation and the light path of the incident light on the sensor (the straight line between the sensor and the point of observation).

Here, if the angle $\phi$ and the angle $\theta$ are equal, one would be observing a regular reflected light, and if the angle $\phi$ and the angle $\theta$ are in equal, one would be observing a dispersant reflected light. The applicant found that, according to our experiment, the white reflection component changes depending on the slippage from the regular reflection, and that the white reflection component gets smaller as the slippage from the regular reflection grows larger on prints printed with a ink containing a certain pigment.

Therefore, the definition of the spectral distribution of the white reflection component by taking into consideration the dependency on angle of the white reflection component in such prints will enable to execute more correct correction. For this purpose, it is possible for example to introduce an angle-dependent coefficient $\beta/|\phi-\theta|$ in the place of the above coefficient $k_w$. In other words, as the coefficient $\beta/|\phi-\theta|$ gets smaller as the slippage from the regular reflection grows larger, the product of multiplying $(x(\lambda)+y(\lambda)+z(\lambda))$ by this coefficient is assumed to be the spectral distribution of the white reflection component.

And the coefficient is determined by a plurality of combinations regarding the angle φ and the angle θ. For example, in executing the flowchart of FIG. 3 in the same configuration as FIG. 2 above, the angle φ relating to the light source in relation to the color chart and the white board and the angle θ relating to the calorimeter 50 are measured. With regards to the calorimeter 50, although it is not necessary to limit the number of light sources to one, the specification of the main light source used for measuring the color of the color chart and the white board will enable to define the angle between the light source and the sample specimen for evaluation.

Upon measuring the angle, operations similar to the flow shown in FIG. 3 above are carried out, and the value of β is determined by taking the coefficient computed by the equation (10) above is the coefficient β/|φ−θ|. When the value of β is determined regarding this combination of angles, the combination of values between the angle φ and the angle θ is changed, and the same operation is repeated several times. As a result, a plurality of β dependent on angle can be obtained, and when the angle φ and the angle θ are determined for computing the calorimetric value under the second observation condition from the calorimetric value acquired under the first observation condition, it will be possible to acquire the spectral distribution of the white reflection component depending on angles, and to carry out corrections depending on angles.

Of course, once a plurality of β values corresponding to the combination of the angle φ and the angle θ are acquired, it is possible to compute by interpolation even in the case of the coefficient β/|φ−θ| with respect to which no actual color measurement has been made by the angle φ and the angle θ. Therefore, it is possible to determine the coefficient β/|φ−θ| regarding the combination of an optional angle φ and angle θ. Incidentally, it is not essential to define the angle dependency as 1/|φ=θ| as described above, and it is possible to change as required according to the dependency on angle of the white reflection component.

Incidentally, the present invention is not limited to the embodiments or variations described above but include configurations in which various systems disclosed in the embodiment or variations mentioned above are mutually replaced or whose combination is changed, configurations in which various systems disclosed in the embodiment or variations mentioned above as well as in the arts already in the public domain are mutually replaced or whose combination is changed and the like.

As described above, according to the present invention, it will be possible to provide a useful art to correct colorimetric values acquired by color measurement under different observation conditions by various modes, and to provide a useful art to generate or print profiles based on colorimetric values under actual observation conditions.

What is claimed is:

1. A spectral distribution computing method for extracting a spectral distribution for correcting a result of color measurement under a first observation condition into a result of color measurement under a second observation condition, comprising:

using a first colorimetric value acquiring unit for acquiring a first calorimetric value obtained by measuring a color of a sample specimen for evaluation under the first observation condition, using a second colorimetric value acquiring unit for acquiring a second colorimetric value obtained by measuring a color of the sample specimen for evaluation under the second observation condition, and using a spectral distribution computing unit for computing a variable component of the spectral distribution depending on an observation condition based on the first calorimetric value and the second calorimetric value as the component of the spectral distribution relating to the sample specimen for evaluation.

2. The method according to claim 1, wherein the first observation condition is an observation condition in a colorimeter for measuring color by using a predetermined light source or light sources and the second observation condition is an observation condition in a colorimeter for measuring color by using any optional light source or light sources.

3. The method according to claim 1, further comprising:
acquiring the first calorimetric value by measuring a color of a specified white board under the first observation condition,
acquiring the second colorimetric value by measuring a color of the specified white board under the second observation condition, and
acquiring the spectral distribution of the light irradiated on the sample specimen for evaluation under various observation conditions based on the first colorimetric value and the second calorimetric value.

4. The method according to claim 1, wherein the component of the spectral distribution is computed by defining the variable component of the spectral distribution depending on the observation condition is the product of multiplying a constant by a function depending on the predetermined wavelength.

5. The method according to claim 4, wherein the function depending on the predetermined wavelength is a linear coupling of color-matching functions.

6. The method according to claim 1, wherein the variable component of the spectral distribution depending on the observation condition is defined as depending on at least one or more among a type of printing medium for printing the sample specimen for evaluation, a type of color material for printing the sample specimen for evaluation, and a type of light source.

7. The method according to claim 1, wherein the variable component of the spectral distribution depending on the observation condition is defined as a function depending on the relative positional relationship among the light source, the sample specimen for evaluation and the light receiving unit of the colorimeter at the time of observing the sample specimen for evaluation under the second observation condition.

8. A calorimetric value correcting method for correcting colorimetric values based on the component of the spectral distribution computed by the spectral distribution computing method according to claim 1, comprising:
acquiring a calorimetric value obtained by measuring the color of the object of color measurement under the first observation condition, and
correcting the calorimetric value acquired into the calorimetric value acquired under the second observation condition based on the computed component of the spectral distribution.

9. A spectral distribution computing device for extracting a spectral distribution for correcting a result of color measurement under a first observation condition into a result of color measurement under a second observation condition, comprising:
a first colorimetric value acquiring unit for acquiring a first colorimetric value obtained by measuring a color of a sample specimen for evaluation under the first observation condition, a second colorimetric value acquiring unit for acquiring a second calorimetric value obtained by measuring a color of the sample specimen for evaluation under the second observation condition, and a spectral distribution computing unit for computing a variable component of the spectral distribution depending on an observation condition as the component of the spectral distribution relating to the sample specimen for evaluation based on the first calorimetric value and the second calorimetric value.

10. A spectral distribution computing program recording medium for making a computer realize the function of extracting a spectral distribution for correcting a result of color measurement under the first observation condition into a result of color measurement under the second observation condition, allowing the realization of:

using a first colorimetric value acquiring unit to perform a first calorimetric value acquiring function for acquiring a first calorimetric value obtained by measuring a color of a sample specimen for evaluation under the first observation condition, using a second colorimetric value acquiring unit to perform a second calorimetric value acquiring function for acquiring a second calorimetric value obtained by measuring a color of the sample specimen for evaluation under the second observation condition, and using a spectral distribution computing unit to perform a spectral distribution computing function for computing a variable component of the spectral distribution depending on an observation condition as the component of the spectral distribution relating to the sample specimen for evaluation based on the first calorimetric value and the second colorimetric value.

11. A spectral distribution computing method for extracting a spectral distribution for correcting a result of color measurement under a first observation condition into a result of color measurement under a second observation condition, wherein the spectral distribution measured under the second observation condition is assumed to include the spectral distribution observed under the first observation condition and the spectral distribution in the prescribed functional form added to the spectral distribution observed under the first observation condition, and the spectral distribution in the prescribed functional form is computed based on the calorimetric value acquired under the first observation condition and the second observation condition.

12. A color measuring method for correcting a result of color measurement under a first observation condition into a result of color measurement under a second observation condition, comprising:

measuring a color of an object of color measurement under the first observation condition, and recording in a specified recording medium, in advance, data for converting a calorimetric value acquired by color measurement into a calorimetric value acquired by measuring the color of the object of color measurement under the second observation condition, and converting the calorimetric value acquired by color measurement into the calorimetric value acquired by measuring the color of the object of color measurement under the second observation condition with reference to the recorded data.

13. A profile generating method for generating a profile for correlating image data and a calorimetric value of an output based on the image data, comprising:

using a colorimetric value acquiring unit for acquiring a calorimetric value of an output result based on the image data by measuring the color of the same under a first observation condition, using a colorimetric value converting unit for converting the calorimetric value acquired into a calorimetric value resulting from the color measurement of the output result under a second observation condition, and using a colorimetric value acquiring unit for generating the profile by correlating the converted colorimetric value and the image data.

14. A printing controlling method for executing printing by converting a color with reference to a color conversion profile wherein, a color conversion profile represents data generated by using a colorimetric value converting unit for acquiring the calorimetric value obtained by measuring under a first observation condition a color of an output result based on an image data handled by a first image equipment, using a converting unit for converting this calorimetric value into a calorimetric value acquired by measuring the color of the output result under a second observation condition, using a correlating unit for correlating the converted calorimetric value with the image data, and using a defining unit for defining a correlation between the image data and a second image data based on this correlation and the correlation between the second image data handled by the second image equipment and the calorimetric value of its output.

\* \* \* \* \*